(12) United States Patent
Kim et al.

(10) Patent No.: US 7,489,658 B2
(45) Date of Patent: Feb. 10, 2009

(54) DUAL STACK MOBILE COMMUNICATION SYSTEM

(75) Inventors: Soo-Jin Kim, Seoul (KR); Hyung-Joon Cho, Seongnam-si (KR); Hee-Hyeok Hahm, Seoul (KR); Sang-Yun Lee, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 555 days.

(21) Appl. No.: 10/497,409

(22) PCT Filed: Dec. 28, 2002

(86) PCT No.: PCT/KR02/02474

§ 371 (c)(1),
(2), (4) Date: Nov. 12, 2004

(87) PCT Pub. No.: WO03/056765

PCT Pub. Date: Jul. 10, 2003

(65) Prior Publication Data

US 2005/0078703 A1    Apr. 14, 2005

(30) Foreign Application Priority Data

Dec. 29, 2001    (KR) ............... 10-2001-0088204

(51) Int. Cl.
*H04Q 7/00*   (2006.01)
*H04L 12/28*  (2006.01)
*H04J 3/16*   (2006.01)

(52) U.S. Cl. .................. 370/331; 370/401; 370/466

(58) Field of Classification Search ............... 370/331, 370/320, 328, 335, 342, 465, 466, 401, 469
See application file for complete search history.

(56) References Cited

U.S. PATENT DOCUMENTS

| | | | | |
|---|---|---|---|---|
| 5,933,784 | A | * | 8/1999 | Gallagher et al. ........ 455/552.1 |
| 6,081,534 | A | * | 6/2000 | Sipila ..................... 370/466 |
| 6,292,496 | B1 | | 9/2001 | Räsänen |
| 6,501,953 | B1 | * | 12/2002 | Braun et al. ............. 455/436 |
| 6,560,456 | B1 | * | 5/2003 | Lohtia et al. ............ 455/445 |
| 6,654,607 | B1 | * | 11/2003 | Shobatake et al. ........ 455/433 |
| 6,741,868 | B1 | * | 5/2004 | Park et al. ............... 455/552.1 |
| 6,757,531 | B1 | * | 6/2004 | Haaramo et al. ......... 455/414.1 |
| 6,782,274 | B1 | * | 8/2004 | Park et al. ............... 455/552.1 |
| 6,853,852 | B1 | * | 2/2005 | Park et al. ............... 455/561 |

(Continued)

FOREIGN PATENT DOCUMENTS

EP    1096816  A2    5/2001

(Continued)

*Primary Examiner*—Firmin Backer
*Assistant Examiner*—Nittaya Juntima
(74) *Attorney, Agent, or Firm*—Lowe Hauptman Ham & Berner, LLP

(57) ABSTRACT

A dual stack mobile communication system is provided for building a single interworking network of an asynchronous network and a synchronous network. A single node is formed by combining the same kind nodes of the asynchronous network and the synchronous network, wherein the single node searches information for generating two output signal points according to a synchronous protocol and an asynchronous protocol in one input signal point according to the synchronous protocol or asynchronous protocol, and generates one output signal point.

5 Claims, 15 Drawing Sheets

U.S. PATENT DOCUMENTS

| | | | |
|---|---|---|---|
| 6,917,813 B2 * | 7/2005 | Elizondo | 455/466 |
| 6,950,419 B1 * | 9/2005 | Park et al. | 370/338 |
| 6,950,876 B2 * | 9/2005 | Bright et al. | 709/230 |
| 6,992,999 B2 * | 1/2006 | Park et al. | 370/332 |
| 7,054,661 B1 * | 5/2006 | Kohli et al. | 455/560 |
| 7,260,406 B2 * | 8/2007 | Lee et al. | 455/456.1 |
| 2001/0021179 A1 | 9/2001 | Tiedemann, Jr. et al. | |

FOREIGN PATENT DOCUMENTS

| | | |
|---|---|---|
| EP | 1102506 A1 | 5/2001 |
| EP | 1119212 A2 | 7/2001 |
| KR | 8898 A | 2/2000 |

* cited by examiner

US 7,489,658 B2

DUAL STACK MOBILE COMMUNICATION SYSTEM

TECHNICAL FIELD

The present invention relates to a dual stack mobile communication system, and in particular to an improved dual stack mobile communication system for building a single interworking network of an old network which is a 2/2.5 generation (2G/2.5G) synchronous mobile communication network such as CDMA2000 communication network (abbreviated as 'old network') and a new network which is a 3 generation (3G) asynchronous mobile communication network such as a universal mobile telecommunications service (UMTS) network (abbreviated as 'new network') in a mobile communication network where the old network and the new network have coexisted.

BACKGROUND ART

Basically, the 2G/2.5G old network is a synchronous network and the 3G new network is an asynchronous network. Since different protocols and subscriber profiles are used in the old network and the new network, internetwork messages are not matched one to one.

In a state where the old network and the new network have been individually built, if network interworking is embodied by using a gateway, a lot of expenses are incurred due to double system investment. In addition to the huge expenses, only a part of functions which can perform mutual message matching can be interworked through a message transformation process of the gateway due to mismatching between the old network and the new network. That is, most of the major functions cannot be interworked. Even if functions of nodes of each network are modified and/or added and a very complicated message flow is generated for internetwork message interworking using the gateway, it not only results in huge expenses for modification and/or addition of the functions of the nodes of each network, but also complicates a message communication process for interworking between the nodes much more than a general communication process of an independent network. In the worst case, the complicated process may generate service failure due to deterioration of communication quality One of the examples will now be suggested in relation to call forwarding.

FIG. 1 is a flowchart showing a call forwarding method in the 2.5G (or 2G) old network.

In a state where a subscriber reception mobile terminal (not shown) has accessed a corresponding mobile switching center (T-MSC) 11, a location registration procedure has been finished according to an old network protocol to register locations of the T-MSC 11 and a corresponding home location register (2G HLR) 12, and thus reception trigger information has been set up in the T-MSC 11. In the old network, the reception trigger information is set up only for call forwarding subscribers during the location registration procedure of the 2G HLR 12 and the T-MSC 11.

On the aforementioned assumptions, if a subscriber origination terminal (not shown) accesses a corresponding mobile switching center (O-MSC) 13 (to communicate with the reception mobile terminal), the O-MSC 13 requests location information of the reception mobile terminal, namely reception information to the 2G HLR 12 (S101), and thus the 2G HLR 12 requests routing to the T-MSC 11 which the reception mobile terminal has accessed (S102).

The T-MSC 11 provides temporary local directory number (TLDN) information of the reception mobile terminal to the 2G HLR 12 as the routing information in response to the routing request (S103), and the 2G HLR 12 provides the TLDN to the O-MSC 13 in response to the location request of S101 (S104), thereby forming a call path between the O-MSC 13 and the T-MSC 11(Isup) (S105).

Thereafter, the T-MSC 11 performs signaling for reception to the reception mobile terminal. Here, if the reception is not successful, the T-MSC 11 performs two operations on the basis of the trigger information and/or call forwarding information of the reception mobile terminal: the T-MSC 11 requests redirection to the O-MSC 13 (S106-1) or directly makes a transfer to number request (TTNR) to a corresponding HLR on the basis of the known call forwarding information (S106-2).

At the step of S106-1, the O-MSC 13 requests call switching information to the 2G HLR 12(TTNR) (S107), and the 2G HLR 12 provides the call switching information, namely call forwarding information to the O-MSC 13 in response to the request (S108).

The procedure of S101 to 105 is repeated among the O-MSC 13, a new HLR and a new T-MSC on the basis of the call forwarding information to form a call path between the O-MSC 13 and the T-MSC for call forwarding, thereby finishing reception (S109).

FIG. 2 is a flowchart showing a call forwarding method in the 3G new network.

In a state where a subscriber reception mobile terminal (not shown) has accessed a corresponding T-MSC 21, a location registration procedure has been finished according to a new network protocol to register locations of the T-MSC 21 and a corresponding 3G HLR 22, and thus forwarding data have been transmitted from the 3G HLR 22 to the T-MSC 21 and stored in the T-MSC 21. In the new network, the forwarding data are stored only for call forwarding subscribers during the location registration procedure of the 3G HLR 22 and the T-MSC 21.

On the aforementioned assumptions, if a subscriber origination terminal (not shown) accesses a corresponding O-MSC 23 (to communicate with the reception mobile terminal), the O-MSC 23 requests location information of the reception-mobile terminal, namely reception information to the 3G HLR 22 (SRI(Send Routing Information))(S201), and thus the 3G HLR 22 requests routing number to the T-MSC 21 which the reception mobile terminal has accessed(PRN(Provide Routing Number)) (S202).

The T-MSC 21 provides mobile station roaming number (MSRN) information to the 3G HLR 22 as the routing information in response to the request (S203), and the 3G HLR 22 provides the MSRN to the O-MSC 23 in response to the request(SRI) of S201(SRI_Ack) (S204), thereby forming a call path between the O-MSC 23 and the T-MSC 21(Isup) (S205).

Thereafter, the T-MSC 21 performs signaling for reception to the reception mobile terminal. Here, if the reception is not successful, the T-MSC 21 performs two operations on the basis of the stored forwarding information: when a subscriber of the forwarding information is for example, a foreign network subscriber, the T-MSC 21 provides the stored forwarding information to the O-MSC 23 to perform the succeeding reception process (RCH; resume call handling) through a corresponding gateway (not shown) (S206-1), performs the procedure of S101 (even when the RCH is converted by the gateway, namely RCH<-->Redirection Request, not LOC but TTNR is performed on the O-MSC) to S105 between the origination party and the reception party to form a call path between the O-MSC 13 and a corresponding T-MSC (not shown) for call forwarding, and finishes reception; and when a subscriber prefix of the forwarding information indicates a local network subscriber, the T-MSC 21 performs S201 on a corresponding JLR (not shown), sequentially performs the procedure of S202 to S205 to form a call path between the O-MSC 23 and a corresponding T-MSC (not shown) for call forwarding, and finishes reception (S206-2).

The RCH of S206-1 is determined according to optimal routing(OR) capability of the O-MSC, the HLR and the T-MSC. There, the T-MSC determines whether to transmit the RCH to the O-MSC. Here, when an operator sets up that the RCH is not performed in O-MSC signal point as in S206-2, the call is setup in a home HLR 24 of a call switching number according to the send routing information (SRI).

As described above with reference to FIGS. 1 and 2, the old network which is a synchronous network and the new network which is an asynchronous network use different protocols. While the HLR manages the call forwarding information and the corresponding MSC sets up the trigger information in the old network, the HLR directly provides the call forwarding information to the corresponding MSC during the location registration procedure and the MSC stores and manages the information in the new network. Accordingly, when the old network and the new network have been individually built, if the two networks are intended to be interworked for call forwarding through the gateway, following problems may occur as shown in FIG. 3.

FIG. 3 is a flowchart showing problems which may be generated when the old network and the new network which have been individually built are intended to be interworked for call forwarding through the gateway.

When a new network subscriber mobile terminal (3G MS) which has accessed a 2G old T-MSC 32 moves and accesses a 2G new T-MSC 31, the 2G new T-MSC 31 requests location registration to a corresponding 2G HLR 35(Registration Notification; RegNot.) according to a location registration procedure of the old network (S301). Because the 2G HLR 35 does not have subscriber information of the 3G MS, the 2G HLR 35 notifies the 2G new T-MSC 31 that the 3G MS is not its subscriber in response to the request (S302). Here, if the 2G new T-MSC 31 is provided with a roaming function, it request location registration to a gateway 33 in the same manner as S301(RegNot.) (S303).

The gateway 33 transforms the requested 2G message (RegNot.), into a corresponding 3G message(UpdateLoc), and requests location update to a corresponding 3G HLR 34 of the new network (S304). The 3G HLR 34 transmits a location cancel request message(CancLoc) to the gateway 33 so that it can be transmitted to the 2G old T-MSC 32 which the 3G MS belonged to before the movement (S305), and the gateway 33 transforms the 3G message(CancLoc) into a corresponding 2G message(RegCan) and transmits it to the 2G old T-MSC 32 (S306). When the 2G old T-MSC 32 responds to the message(regcan_Ack) (S307), the gateway 33 transforms the response message(regcan_Ack) into a 3G message (canc_Loc_Ack), and transmits it to the 3G HLR 34 in response to S305 (S308).

Here, the 3G HLR 34 transmits subscriber information including call switching information for call forwarding to the gateway 33 in response to the location update message (UpdateLoc) of S304 so that it can be transmitted to the 2G new T-MSC 31 which 3G MS currently belongs to(Insert Sub Data) (S309). When receiving the response from the gateway 33 (S310), the 3G HLR 34 transmits the location update message(UpdateLoc) to the gateway 33 so that it can be transmitted to the 2G new T-MSC 31 which the 3G MS currently belongs to (S311), and the gateway 33 transforms the 3G message(UpdataLoc) into a 2G message(Regnot_ack) and transmits it to the 2G new T-MSC 31 in response to S303 (S312). Here, the 2G message(Regnot_ack) cannot transmit the call switching information for call forwarding defined in 3G, and thus fails to transmit the trigger information which is a procedure of 2G. Although the location registration procedure is finished, the 2G new T-MSC 31 does not have the call switching information of 3G and the trigger information of 2G. As a result, the call forwarding service cannot be provided through the 2G new T-MSC 31 which the 3G MS currently belongs to.

When the new network and the old network have been individually built, if the new network and the old network are intended to be interworked by using the gateway, they are not interworked because the internetwork messages cannot be matched one to one due to different protocols and subscriber profiles. The interworking failure in call forwarding was explained above, but there are still potential problems, such as service failures in basic calls, short messages, etc., and complication of the message communication.

DISCLOSURE OF INVENTION

Accordingly, it is an object of the present invention to provide a dual stack mobile communication system which can smoothly interwork an old network and a new network in the whole services of the old network and the new network by overcoming mismatching of messages and subscriber profiles due to different protocols of the two networks, without introducing a gateway and a complicated message flow.

In order to achieve the above-described object of the invention, there is provided a dual stack mobile communication system of a mobile communication network in which an old synchronous network and a new asynchronous network coexist, which forms a single node by combining same kind nodes of the old network and the new network, wherein the single node searches information for generating two output signal points according to a synchronous protocol and an asynchronous protocol in one input signal point according to the synchronous protocol or asynchronous protocol, and generates one output signal point.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A dual stack mobile communication system in accordance with a preferred embodiment of the present invention will now be described in detail with reference to the accompanying drawings.

Figure 1:
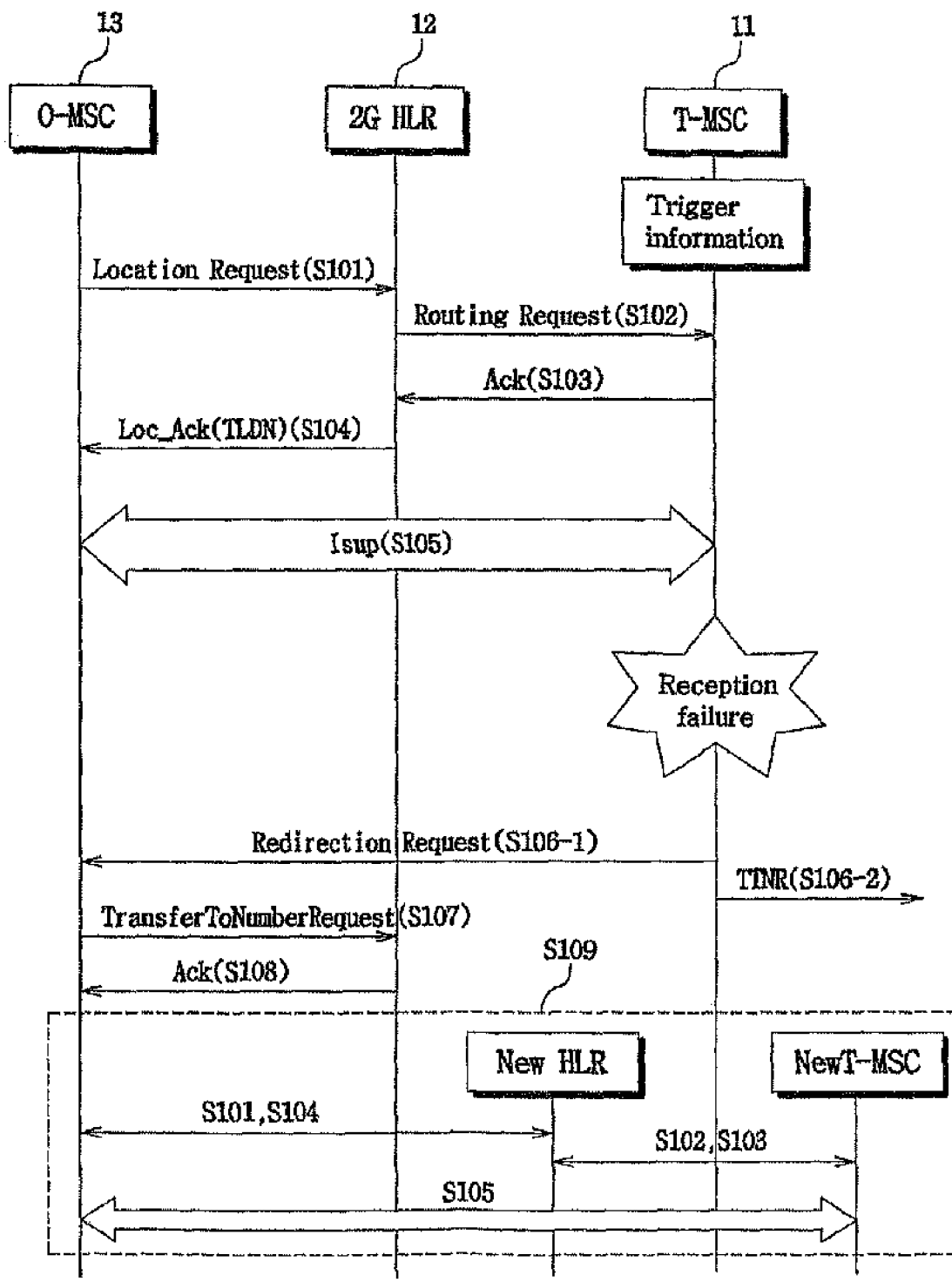
FIG. 1 is a flowchart showing a call forwarding method in a 2.5G (or 2G) old network.
Figure 2:
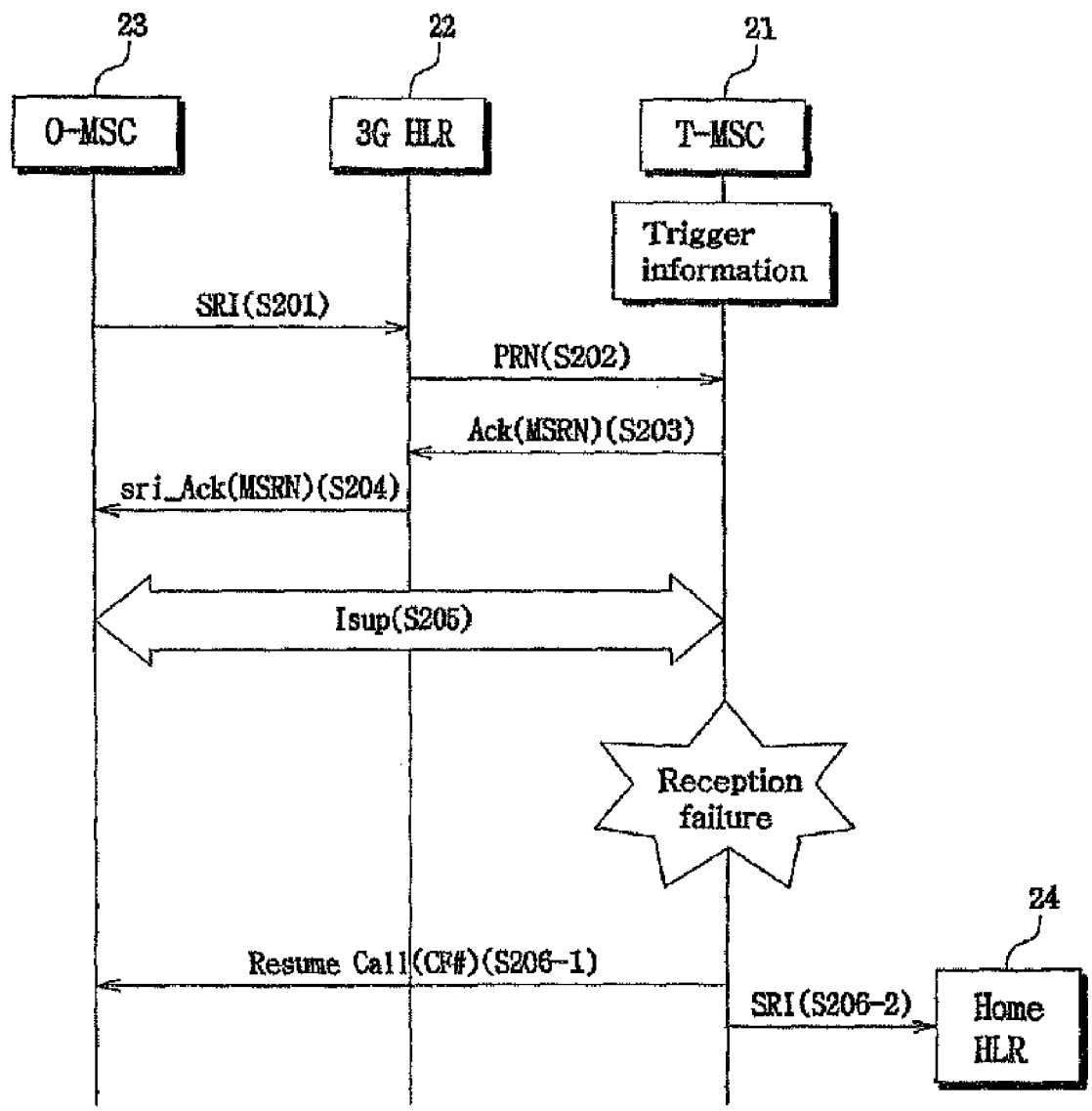
FIG. 2 is a flowchart showing a call forwarding method in a 3G new network.
Figure 3:
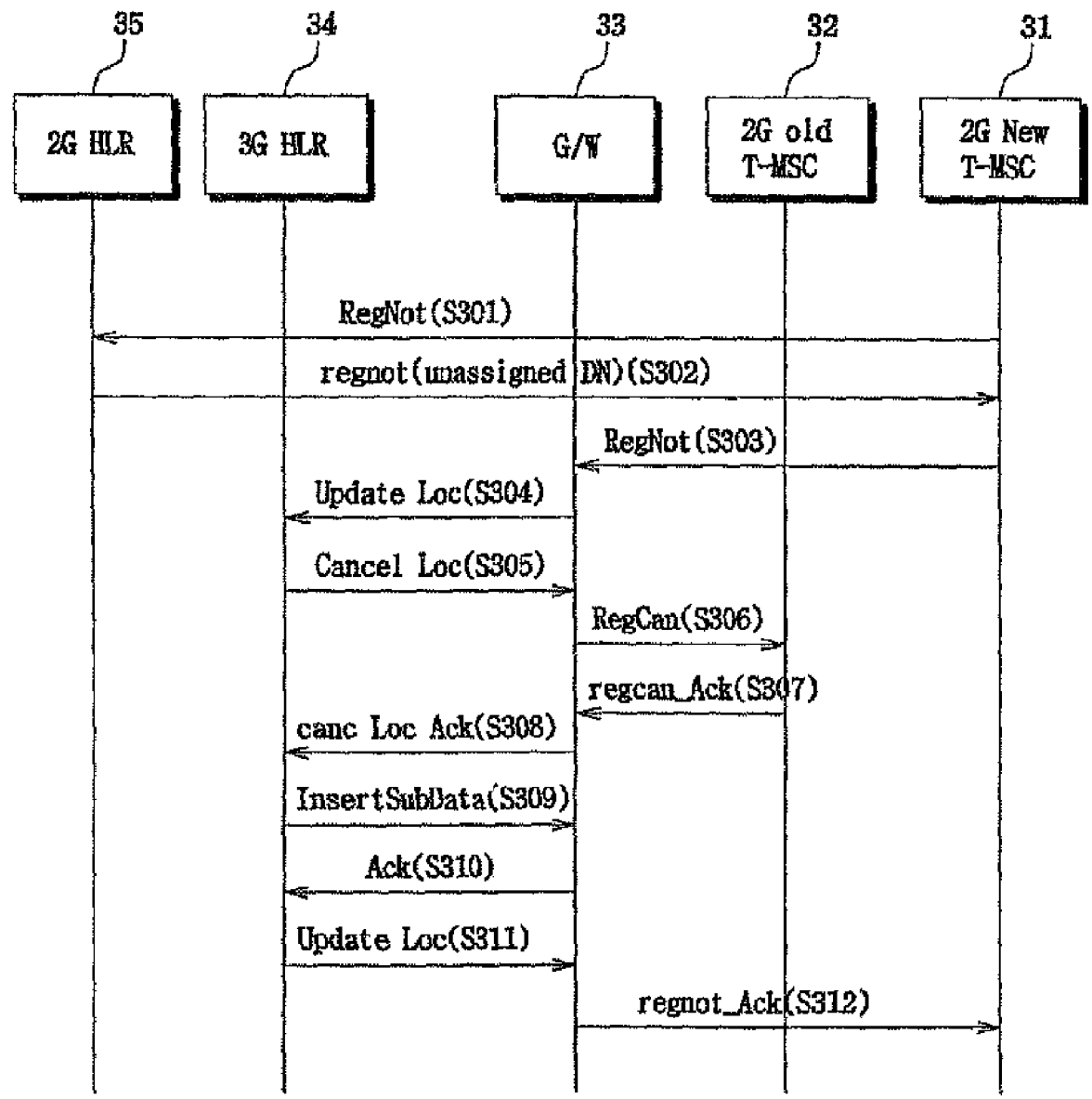
FIG. 3 is a flowchart showing problems which may be generated when the old network and the new network which have been individually built are intended to be interworked for call forwarding through a gateway.
Figure 4:
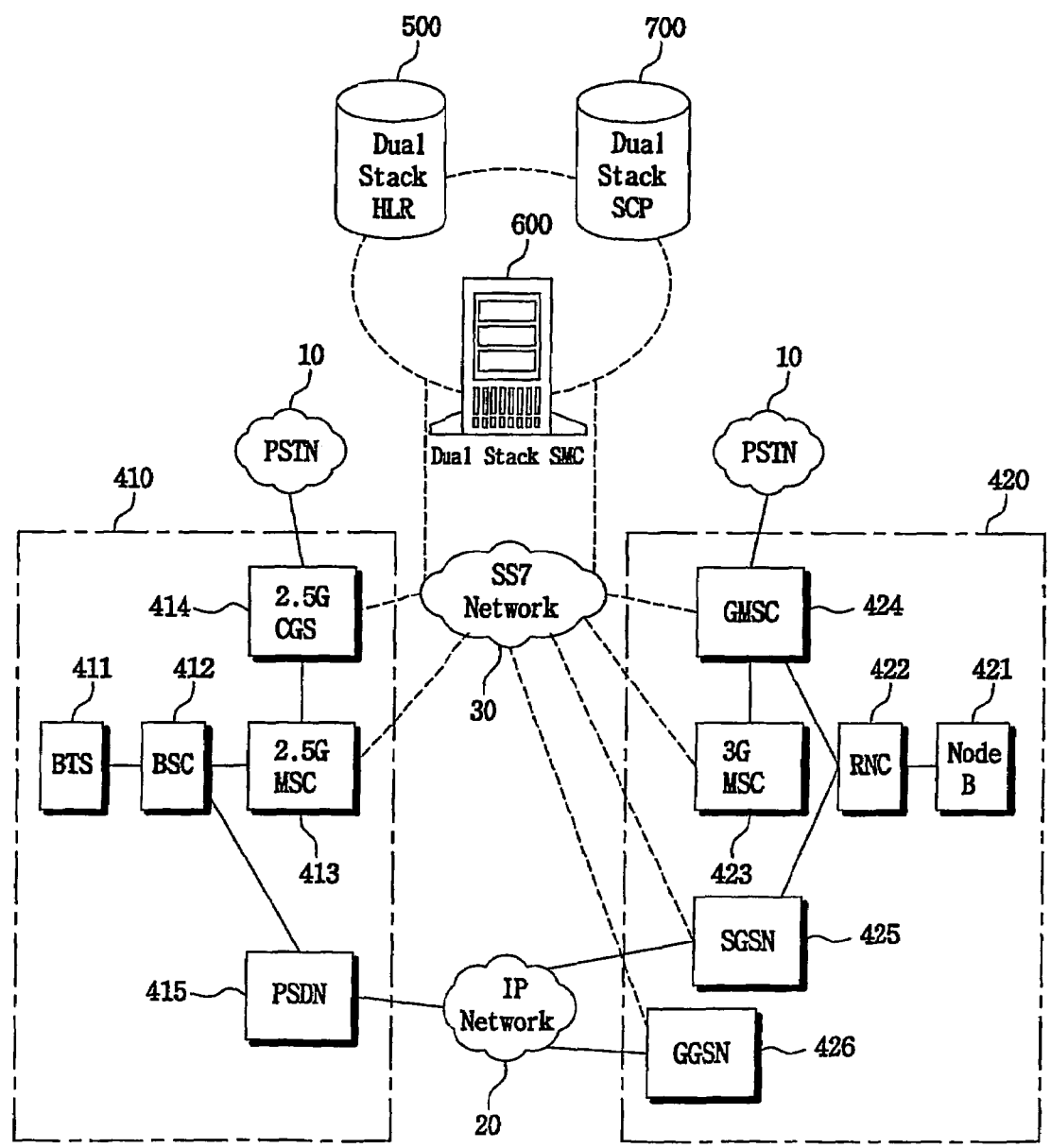
FIG. 4 is a structure view illustrating a dual stack mobile communication system in accordance with a preferred embodiment of the present invention.

FIG. 4 is a structure view illustrating the dual stack mobile communication system in accordance with the preferred embodiment of the present invention. Referring to FIG. 4, the dual stack mobile communication system includes: a 2.5G synchronous mobile communication system 410 composed of a base station (BTS) 411 for performing radio section communication with a 2.5G and/or 2.5G/3G mobile terminal, a base station controller (BSC) 412 for controlling the BTS 411, a 2.5G mobile switching center (2.5G MSC) 413 connected to at least one BSC 412 for switching calls, a 2.5G CGS 414 connected between a public switched telephone network (PSTN) 10 and the 2.5G MSC 413 for switching network interworking calls with the PSTN 10, and a packet data serving node (PDSN) 415 connected between the BSC 412 and an internet protocol network (IP network) 20 for providing packet data services; a 3G asynchronous mobile communication system 420 composed of a node B 421 which is a base station for performing radio section communication with a 3G and/or 2.5G/3G mobile terminal, a radio network controller (RNC) 422 for controlling the node B 421, a 3G mobile switching center (3G MSC) 423 connected to at least one RNC 422 for switching calls, a 3G gate mobile switching center (GMSC) 424 connected between the PSTN 10 and the 3G MSC 423 for switching network interworking calls with the PSTN 10, a serving GPRS support node(SGSN) 425 connected between the RNC 422 and the IP network 20 for maintaining location tracks of the mobile terminal, controlling access and performing a security function, and a gateway GPRS support node (GGSN) 426 connected to the IP network 20 for supporting interworking of the network and external packets, and connected through the medium of the SGSN 425 and an IP-based packet domain PLMN backbone network; an SS7 network 30 for mutually connecting the 2.5G MSC 413, the 2.5G CGS 414, the 3G MSC 423, the 3G GMSC 424, the SGSN 425 and the GGSN 426 to switch calls; a dual stack home location register (dual stack HLR) 500 connected to the SS7 network 30 for managing call processing databases such as location registration of 2G/3G subscribers to perform the function of the existing 2.5G HLR and the function of the 3G HLR, searching information for generating two output signal points according to a 2.5G synchronous protocol and a 3G asynchronous protocol in one input signal point according to the 2.5G synchronous protocol or 3G asynchronous protocol, generating one output signal point, and outputting a corresponding message to the output signal point; a dual stack short message service center (dual stack SMC) 600 connected to the SS7 network 30 for managing short message services for the 2G/3G subscribers to perform the function of the existing 2.5G SMC and the function of the 3G SMC, searching information for generating two output signal points according to the 2.5G synchronous protocol and the 3G asynchronous protocol in one input signal point according to the 2.5G synchronous protocol or 3G asynchronous protocol, generating one output signal point, and outputting a corresponding message to the output signal point; and a dual stack service control point (dual stack SCP) 700 connected to the SS7 network 30 for managing intelligence network services for the 2G/3G subscribers to perform the function of the existing 2.5G SCP and the function of the 3G SCP, searching information for generating two output signal points according to the 2.5G synchronous protocol and the 3G asynchronous protocol in one input signal point according to the 2.5G synchronous protocol or 3G asynchronous protocol, generating one output signal point, and outputting a corresponding message to the output signal point.

Still referring to FIG. 4, the dual stack mobile communication system has the same structure as the 2.5G independent mobile communication network and the 3G independent mobile communication network except for the dual stack HLR 500, the dual stack SMC 600 and the dual stack SCP 700. Therefore, the dual stack HLR 500, the dual stack SMC 600 and the dual stack SCP 700 will now be described in detail.

Figure 5:
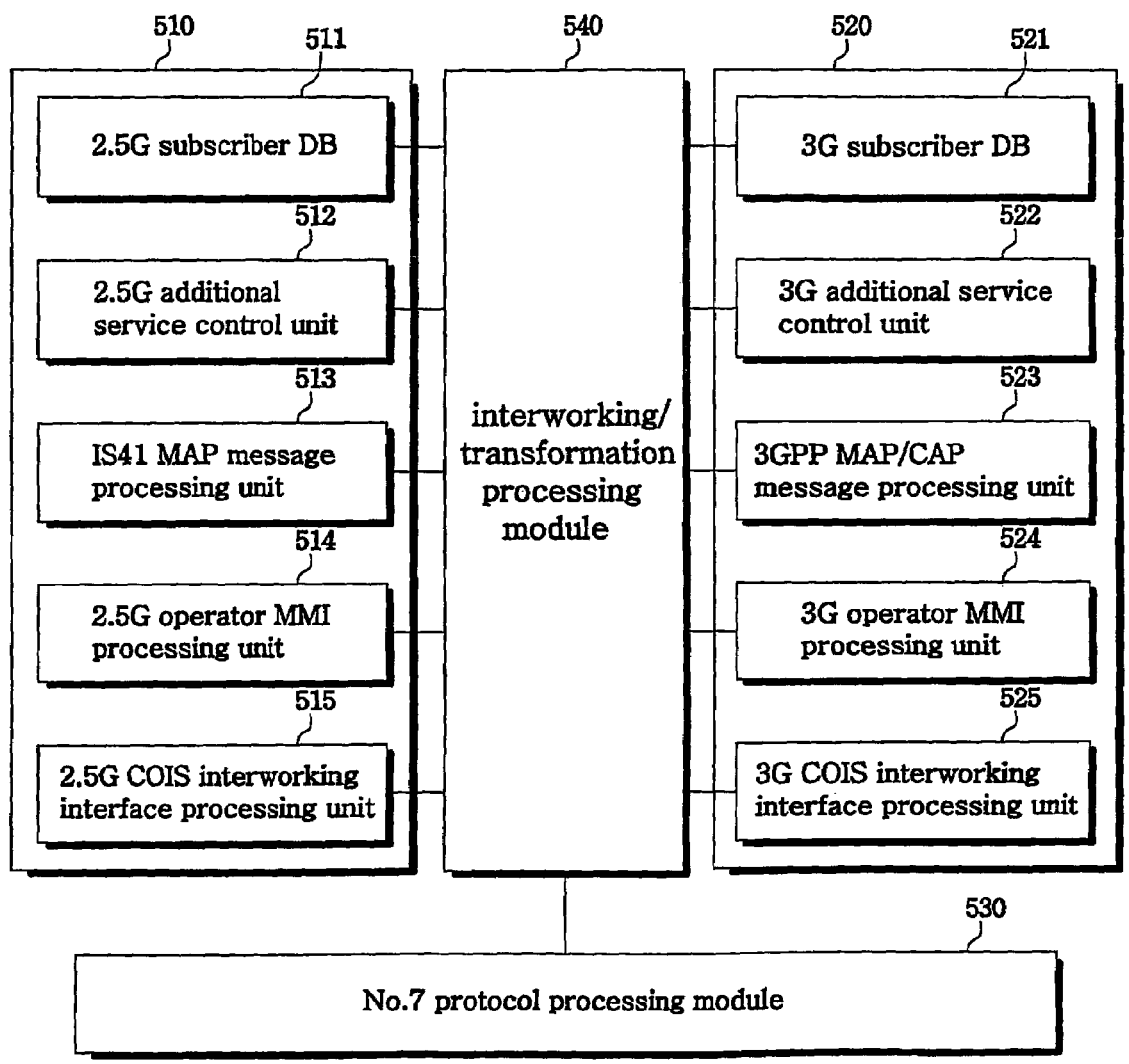
FIG. 5 is a detailed block diagram illustrating a dual stack HLR of FIG. 4.

FIG. 5 is a detailed block diagram illustrating the dual stack HLR 500 of FIG. 4. As shown in FIG. 5, the dual stack HLR 500 includes: a 2.5G subscriber signal processing module 510 composed of a 2.5G subscriber DB 511, a 2.5G additional service control unit 512, an IS41 mobile application part (MAP) message processing unit 513, a 2.5G operator man-machine interface (MMMI) processing unit 514 and a 2.5G COIS interworking interface processing unit 515, for processing signals of the 2.5G subscriber according to the 2.5G synchronous protocol; a 3G subscriber signal processing module 520 composed of a 3G subscriber DB 521, a 3G additional service control unit 522, a 3GPP MAP/CAP message processing unit 523, a 3G operator MMI processing unit 524 and a 3G COIS interworking interface processing unit 525, for processing signals of the 3G subscriber according to the 3G asynchronous protocol; a No.7 protocol processing module 530 interworked with the SS7 network 30 for signaling the I/O signal point; and an interworking/transformation processing module 540 for mutually interworking and controlling the 2.5G subscriber signal processing module 510 and the 3G subscriber signal professing module 520, searching information for generating two output signal points according to the 2.5G synchronous protocol and the 3G asynchronous protocol in one input signal input point according to the 2.5G synchronous protocol or 3G asynchronous protocol, and generating one output signal point.

The 2.5G subscriber DB 511 indicates a DB for each subscriber in the old 2.5G synchronous mobile communication network, containing MS, subscriber authorization information (i.e., terminal power state, origination/reception authorization information, charging information), subscriber location information, subscriber service information (i.e., activation information for each additional service), service addition information (i.e., reference information for each special additional service), subscriber tracing function activation information, password information for each additional service, voice mail service (VMS) information (i.e., home VMS location of subscribers, message existence display information), additional SMS-related information, and member information for other group services.

The 3G subscriber DB 521 indicates a DB for each subscriber in the new 3G asynchronous mobile communication network. The differences between the 2.5G subscriber DB 511 and the 3G subscriber DB 521 will now be explained. First, the subscriber number information is composed of MIN in the 2.5G, but divided into IMSI and MSISDN in the 3G. The subscriber authorization information is more specified in the 3G than IS41 of the 2.5G. The 2.5G and the 3G have different message types containing the subscriber location information, and different state machines for each additional service. That is, while the 2.5G merely displays the activation state, the 3G displays the provision, registration, activation and induction states. In addition, the 2.5G and the 3G have different subscriber tracing schemes. The passwords for each additional service are obtained from the IS41 series DB of the 2.5G. The 3G uses VMS access and notification different from a link layer access protocol-channel D (LAPD). The 2.5G and the 3G use different methods for handling the SMS failure (2.5G is based on reception and 3G is based on origination) and have different related-DB contents. Because the group services are provided in an intelligence network type differently from the prior art, the 2.5G subscriber DB 511 of the IS41 series is used to provide related services.

The 2.5G additional service control unit 512 performs a control operation of various additional services in the old IS41 network.

Compared with the 2.5G additional service control unit 512 of the IS41 series, the 3G additional service control unit 522 provides services similar to the existing 2.5G additional services but is different in subscriber using method or priority and relation of the services. A special control method is necessary to provide the additional service which only exists in the old 2.5G IS 41 series. In the case of the additional service which only exists in the 3G, it should be embodied to provide the same subscriber interface in the whole network (IS41, 3G) within the range of the IS41 standard from the side of subscribers.

The IS41 MAP message processing unit 513 defines the MAP in the IS 41, for performing the subscriber location registration, routing information allocation and transmission, and additional service control.

The 3G MAP/CAP message processing unit 523 basically conforms to the 3GPP 29.002 MAP standard which is very different from the IS41 in message kind or parameter. While the 3GPP classifies messages by uses and provides an additional service control function mostly to the MSC, the IS41 combines the messages and provides the additional service control function not to the MSC but the HLR. Due to the differences between the 3G and the 2.5G, part of the messages for additional service control defined between the MSC and the SCP in the 3GPP must be included in the dual stack HLR 500. As a result, the IS41 and the 3GPP are not different in basic uses but different in classification and basic control, which requires the following functions: parameter A of 3G MAP message 1 is included to 3G MAP message 2; part of 3G CAP messages are used by the HLR and the MSC, not between the SCP and the MSC; additional use of 3G MAP message 3, namely message 3 which has been transmitted to the T-MSC is transmitted to the O-MSC; and 3G MAP messages 20 and 21 are transmitted to the MSC to perform a function of IS41 message 10.

The 2.5G operator MMI processing unit 514 includes commands and functions defined in order for the operator to operate the HLR in the IS41 network. The major functions of the 2.5G operator MMI processing unit 514 will now be explained. It performs various local data operations including the signal point, for example No.7 MTP and SCCP data operations, and classifies and processes protocols (IS41, 3GPP). In addition, the 2.5G operator MMI processing unit 514 changes various system parameters (for example, guide broadcasting codes, digit reception from subscribers, feature codes for each additional service and triggering information), and information relating to the additional services for each subscriber. It also performs HLR hardware operation functions (for example, alarm processing, reset, etc.).

The 3G operator MMI processing unit 524 is configured to simultaneously process IS41 and 3G-related contents according one command in the cases of the 3G MMI processing part in function block and similar kind MMI for convenience of the operator. That is, the MMI can be divided into following types in the dual stack HLR 500. 2G single type MMI command A is composed of parameters a, b and c, 2.5G/3G integration type MMI command B is composed of parameters a, b, c and d, and 3G single type MMI command C is composed of a parameter d. Here, the parameters a, b and c are 2G parameters, and the parameter d is a 3G parameter.

In the 2.5G COIS interworking interface processing unit 515, COIS implies an interface between the client center and the HLR for processing the client data. That is, the 2.5G COIS interworking interface processing unit 515 processes registration and deletion of the subscribers and modifies information (additional service and authorization information).

In the 3G COIS interworking interface processing unit 516, COIS implies an interface between the client center for WCDMA and the HLR. That is, the 3G COIS interworking interface processing unit 516 processes registration and deletion of WCDMA subscribers (including subscribers who change mobile terminals) and modifies information (additional service and authorization information). Here, when the client center has special interfaces for each HLR and each subscriber, it reduces system performance and makes consultants confused. Therefore, the interfaces must be configured in an integration form. The HLR must include the integrated interface but differently process it according to types (existing subscribers and new WCDMA subscribers) and locations (old network, WCDMA network or foreign network roaming) of the subscribers. The method for processing each COIS field in the dual stack HLR 500 must be performed as shown in Table 1.

TABLE 1

| Field Name | Parameter | Subscriber Location | Processing Method |
|---|---|---|---|
| A | Aa/Ab/Ac | IS41/ WCDMA | Extract, set up and transmit information relating to field A in WCDMA, namely 3 G network |
| B | Ba/Bb/Bc (also added for WCDMA network) | IS41/ WCDMA | Transmit information relating to parameters Ba and Bb in IS41, namely 2.5 G network Transmit information relating to parameter Bc in WCDMA, namely 3 G network |
| C (for WCDMA) | Ca (WCDMA)/ Cb (WCDMA) Cc (relating to IS41) | IS41/ WCDMA | Transmit information relating to parameter Cc in IS41, namely 2.5 G network Transmit information relating to parameters Ca and Cb in WCDMA, namely 3 G network |

In addition, the No.7 protocol processing module 530 is upgraded to white book No.7 in the WCDMA network, namely 3G network differently from blue book No.7 of the 2.5G IS41 network. The following items should be considered: it supports ITU-T white book SCCP version (for example, it supports extended unit data messages which have not been supported in order to distinguish the IS41 network from the WCDMA network by real signal points, and transmit more subscriber profiles (relating to circuits, data, etc.) in the WCDMA network than the IS41 network); it supports SCCP global title addressing (only PC-SSN type addressing has been supported in the prior art); and it supports dual-MAP ASE (GSM and IS-41 are distinguished by point codes).

As described above, the 2.5G subscriber signal processing module 510 and the 3G subscriber signal processing module 520 have different functions. Accordingly, it is necessary to integrate a variety of interworking functions and interfaces of the 2.5G and the 3G on the basis of the aforementioned differences, instead of simply combining data and control operations thereof. For this, the interworking/transformation processing module 540 mutually interworks and controls the 2.5G subscriber signal processing module 510 and the 3G subscriber signal processing module 520, searches information for generating two output signal points according to the 2.5G synchronous protocol and the 3G asynchronous protocol in one input signal point according to the 2.5G synchronous protocol or 3G asynchronous protocol, and generates one corresponding output signal point.

Figure 6:
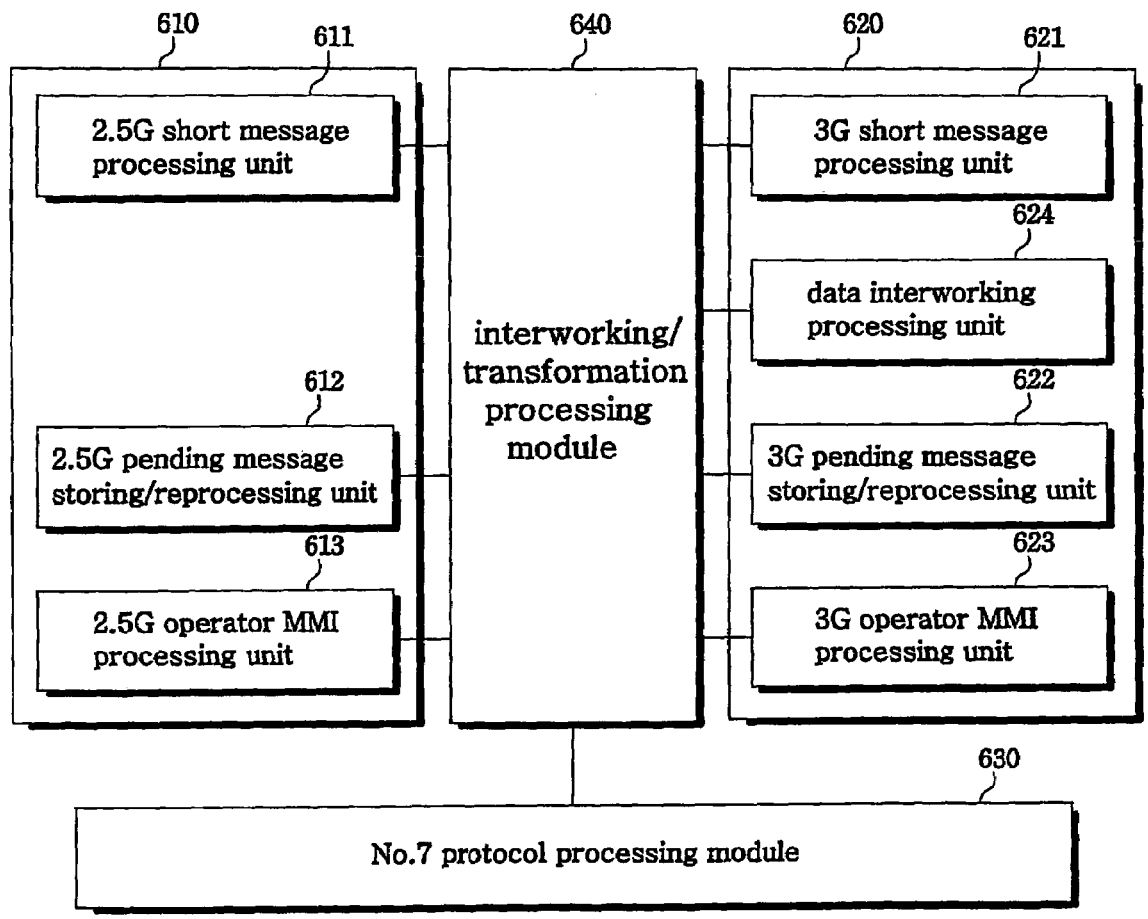
FIG. 6 is a detailed block diagram illustrating a dual stack short message service center of FIG. 4.

FIG. 6 is a detailed block diagram illustrating the dual stack SMC 600 of FIG. 4. As illustrated in FIG. 6, the dual stack SMC 600 includes: a 2.5G subscriber short message processing module 610 composed of a 2.5G short message processing unit 611, a 2.5G pending message storing/reprocessing unit 612 and a 2.5G operator MMI processing unit 613, for processing short messages of the 2.5G subscribers according to the 2.5G synchronous protocol; a 3G subscriber short message processing module 620 composed of a 3G short message processing unit 621, a 3G pending message storing/reprocessing unit 622, a 3G operator MMI processing unit 623 and a data interworking processing unit 624, for processing short messages of the 3G subscribers according to the 3G asynchronous protocol; a No.7 protocol processing module 630 interworked with the SS7 network 30 for signaling the I/O signal point; and a short message interworking/transformation processing module 640 for mutually interworking and controlling the 2.5G subscriber short message processing module 610 and the 3G subscriber short message processing module 620, searching information for generating two output signal points according to the 2.5G synchronous protocol and the 3G asynchronous protocol in one input signal point according to the 2.5G synchronous protocol or 3G asynchronous protocol, and generating one corresponding output signal point.

The 2.5G short message processing unit 611 processes short message service-related messages (MAP) of the 2.5G IS41 series, and the 3G short message processing unit 621 processes short message service-related messages (MAP) of the 3GPP.

The 2.5G pending message storing/reprocessing unit 612 serves to store, manage and re-transmit pending messages in the 2.5G network. The 3G pending message storing/reprocessing unit 622 serves to store, manage and re-transmit pending messages in the 3G network, but manages them by detailed reasons of the message transmission failure.

The 2.5G operator MMI processing unit 613 includes commands and functions defined in order for the operator to operate the SCP in the 2.5G IS41 network. The major functions of the 2.5G operator MMI processing unit 613 are as follows: it performs local data operations including the signal points (for example, No.7 MTP, SCCP data operations, protocol (IS41, 3GPP) sorting and processing); it executes HLR hardware operations (for example, alarm process and reset); and it traces messages, and extracts and re-transmits non-transmitted messages.

The 3G operator MMI processing unit 623 is configured to simultaneously process IS41 and 3G-related contents according one command in the cases of the 3G MMI processing part in function block and similar kind MMI for convenience of the operator. That is, the MMI can be divided into following types in the dual stack SMC 600. 2G single type MMI command A is composed of parameters a, b and c, 2.5G/3G integration type MMI command B is composed of parameters a, b, c and d, and 3G single type MMI command C is composed of a parameter d. Here, the parameters a, b and c are 2G parameters, and the parameter d is a 3G parameter. The basic functions and uses of the 3G operator MMI processing unit 623 are similar to those of the 2.5G operator MMI processing unit 613.

The data interworking processing unit 624 is provided with messages to be transmitted to a packet network (SGSN in the new network), differently from the old network.

As described above, the 2.5G subscriber short message processing module 610 and the 3G subscriber short message processing module 620 have different functions. Accordingly, on the basis of the aforementioned differences in the SMS processing method between the old network (2.5G) and the new network (3G), the interworking/transformation processing module 640 controls interworking such as pending processing because the old network transmits an MO message to a home SMC of a reception number (based on reception) and the new network transmits the MO message to a home SMC of an origination number (based on origination), and performs a control operation of transformation between protocols because the method for processing the protocol of the input SMS data of the existing subscribers is different from the method for processing TPDU which is the protocol of the new SMS.

That is, the interworking/transformation processing module 640 mutually interworks and controls the 2.5G subscriber signal processing module 510 and the 3G subscriber signal processing module 520, searches information for generating two output signal points according to the 2.5G synchronous protocol and the 3G asynchronous protocol in one input signal point according to the 2.5G synchronous protocol or 3G asynchronous protocol, and generates one corresponding output signal point.

Figure 7:
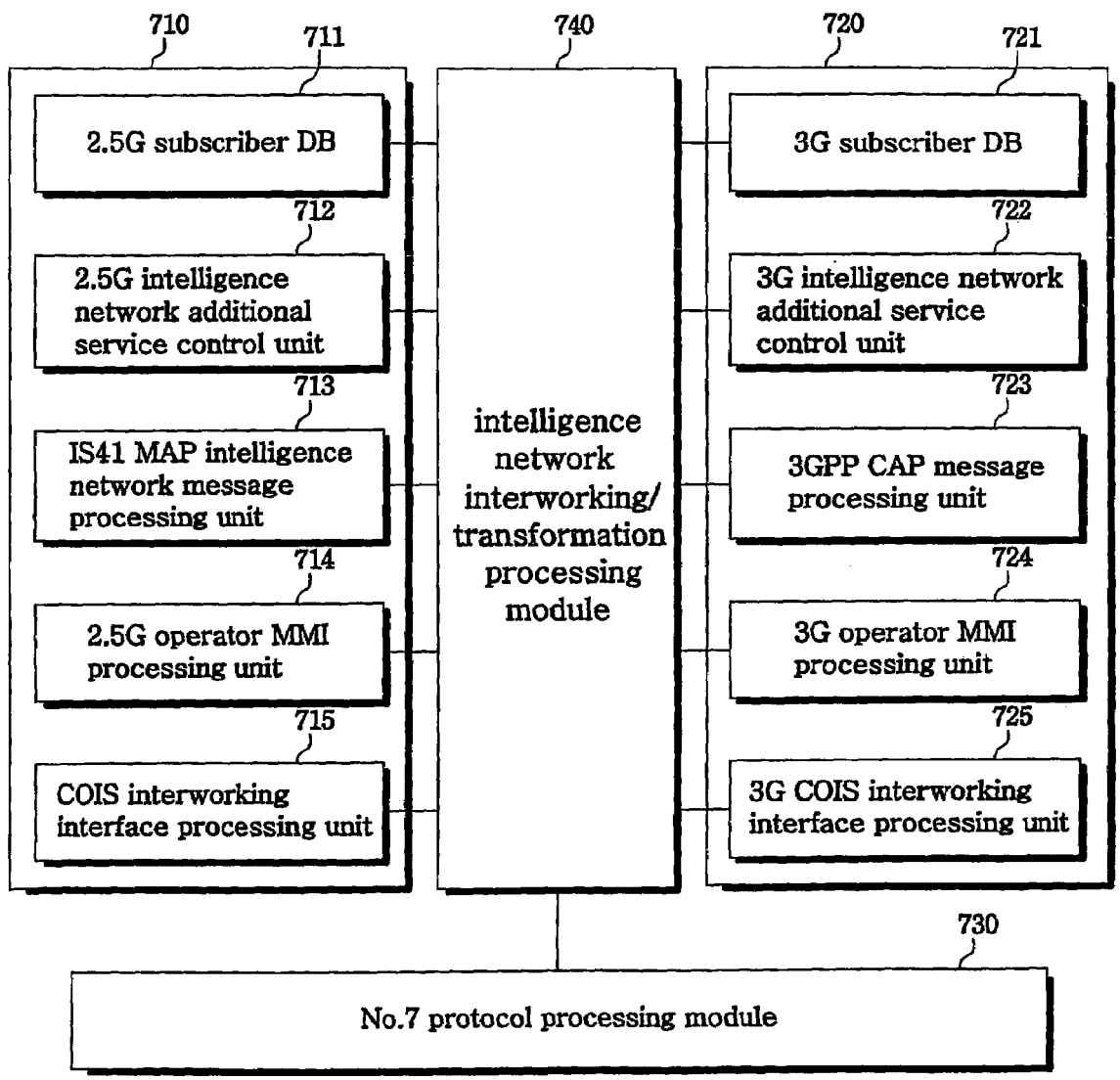
FIG. 7 is a detailed block diagram illustrating a service control point of FIG. 4.

FIG. 7 is a detailed block diagram illustrating the SCP 700 of FIG. 4. As shown in FIG. 7, the SCP 700 includes: a 2.5G subscriber intelligence network signal processing module 710 composed of a 2.5G subscriber DB 711, a 2.5G intelligence network additional service control unit 712, an IS41 MAP intelligence network message processing unit 713, a 2.5G operator MMI processing unit 714 and a 2.5G COIS interworking interface processing unit 715, for processing intelligence network signals of the 2.5G subscribers according to the 2.5G synchronous protocol; a 3G subscriber intelligence network signal processing module 720 composed of a 3G subscriber DB 721, a 3G intelligence network additional service control unit 722, a 3GPP CAP message processing unit 723, a 3G operator MMI processing unit 724 and a 3G COIS interworking interface processing unit 725, for processing intelligence network signals of the 3G subscribers according to the 3G asynchronous protocol; a No.7 protocol processing module 730 interworked with the SS7 network 30 for signaling the I/O signal point; and an intelligence network interworking/transformation processing module 740 for mutually interworking and controlling the 2.5G subscriber intelligence network signal processing module 710 and/or the 3G subscriber intelligence network signal processing module 720, searching information for generating two output signal points according to the 2.5G synchronous protocol and the 3G asynchronous protocol from the 2.5G subscriber intelligence network signal processing module 710 and the 3G subscriber intelligence network signal processing module 720 in one input signal point according to the 2.5G synchronous protocol or 3G asynchronous protocol, and generating one corresponding output signal point.

The 2.5G subscriber DB 711 indicates a DB for each subscriber for providing intelligence network services in the old 2.5G synchronous mobile communication network, which contains MIN and necessary information for additional services. The information for additional services contains account, card and password information for providing PPS or charging-related intelligence network services, discount area information for applying a discount rate in an application area of the subscribers, password information for each additional service of the subscribers (if necessary), information for additional service permission such as the SMS (maximum free SMS call number, etc.), and information for processing other related additional services.

The 3G subscriber DB 721 is a DB for each subscriber for providing intelligence network services in the new 3G asynchronous mobile communication network. The intelligence network services are provided by current subscriber locations, regardless of reception and origination. That is, most of the DB fields contain information determined by the intelligence network services, and thus only protocols (WIN or CAP) are varied according to the transmitted object (2.5G or 3G). Here, the IMSI and the MSISDN are mutually referred. According to a kind of parameters, they may be partially referred, matched to a predetermined value and transmitted.

The 2.5G intelligence network additional service control unit 712 performs a control operation for various intelligence network additional services in the old IS41 2.5G network, for example, controls 2.5G calls for subscriber authentication, charging discount information and intelligence services.

The 3G intelligence network additional service control unit 722 performs a control operation for various intelligence network additional services in the new 3GPP network, for example, controls 3G calls for subscriber authentication, charging discount information and intelligence services.

The IS41 MAP intelligence network message processing unit 713 processes intelligence network messages in the old IS41 2.5G network.

The 3GPP CAP message processing unit 723 processes intelligence network messages in the new 3GPP network.

The 2.5G operator MMI processing unit 714 includes commands and functions defined in order for the operator to operate the SCP in the IS41 network. The major functions of the 2.5G operator MMI processing unit 714 will now be explained. It performs various local data operations including the signal point (for example, No.7 MTP and SCCP data operations, and protocol (IS41, 3GPP) classifications and processing). In addition, the 2.5G operator MMI processing unit 714 changes information relating to the intelligence network additional services for each subscriber (for example, accounts, passwords, discount areas, free SMS message numbers), and performs HLR hardware operation functions (for example, alarm process, reset, etc.).

The 3G operator MMI processing unit 724 is configured to simultaneously process IS41 and 3G-related contents according one command in the cases of the 3G MMI processing part in function block and similar kind MMI for convenience of the operator. That is, the MMI can be divided into following types in the dual stack SCP 700. 2G single type MMI command A is composed of parameters a, b and c, 2.5G/3G integration type MMI command B is composed of parameters a, b, c and d, and 3G single type MMI command C is composed of a parameter d. Here, the parameters a, b and c are 2G parameters, and the parameter d is a 3G parameter. The basis functions and the uses of the 3G operator MMI processing unit 724 are similar/identical to the 2.5G operator MMI processing unit 714.

In the 2.5G COIS interworking interface processing unit 715, COIS implies an interface between the client center and the SCP. That is, the 2.5G COIS interworking interface processing unit 715 processes intelligent network registration and deletion of the subscribers and modifies information (additional service and authorization information).

In the 3G COIS interworking interface processing unit 725, COIS implies an interface between the client center for the WCDMA and the SCP. That is, the 3G COIS interworking interface processing unit 725 processes registration and deletion of the WCDMA subscribers (including subscribers who change mobile terminals) and modifies information (additional service and authorization information). Here, when the client center has special interfaces for each SCP and each subscriber, it reduces system performance and makes consultants confused. Therefore, the interfaces must be configured in an integration form. The SCP must include the integrated interface but differently process it according to types (existing subscribers and new WCDMA subscribers) and locations (old network, WCDMA network or foreign network roaming) of the subscribers. The method for processing each COIS field in the dual stack SCP 700 must be performed as shown in Table 2.

TABLE 2

| Field Name | Parameter | Subscriber Location | Processing Method |
|---|---|---|---|
| A | Aa/Ab/Ac | IS41/ WCDMA | Extract, set up and transmit information relating to field A in WCDMA, namely 3 G network |

TABLE 2-continued

| Field Name | Parameter | Subscriber Location | Processing Method |
|---|---|---|---|
| B | Ba/Bb/Bc (also added for WCDMA network) | IS41/ WCDMA | Transmit information relating to parameters Ba and Bb in IS41, namely 2.5 G network Transmit information relating to parameter Bc in WCDMA, namely 3 G network |
| C (for WCDMA) | Ca (WCDMA)/ Cb (WCDMA) Cc (relating to IS41) | IS41/ WCDMA | Transmit information relating to parameter Cc in IS41, namely 2.5 G network Transmit information relating to parameters Ca and Cb in WCDMA, namely 3 G network |

In addition, the No.7 protocol processing module 730 is upgraded to white book No.7 in the WCDMA network, namely 3G network differently from blue book No.7 of the 2.5G IS41 network. The following items should be considered: it supports ITU-T white book SCCP version (for example, it supports extended unit data messages which have not been supported in order to distinguish the IS41 network from the WCDMA network by real signal points, and transmit more subscriber profiles (relating to circuits, data, etc.) in the WCDMA network than the IS41 network); it supports SCCP global title addressing (only PC-SSN type addressing has been supported in the prior art); and it supports dual-MAP ASE (GSM and IS-41 are distinguished by point codes).

As described above, the 2.5G subscriber signal processing module 710 and the 3G subscriber signal processing module 720 have different functions. Accordingly, it is necessary to integrate a variety of interworking functions and interfaces of the 2.5G and the 3G on the basis of the aforementioned differences, instead of simply combining data and control operations thereof. For this, the intelligence network interworking/transformation processing module 740 mutually interworks and controls the 2.5G subscriber signal processing module 710 and the 3G subscriber signal processing module 720, searches information for generating two output signal points according to the 2.5G synchronous protocol and the 3G asynchronous protocol in one input signal point according to the 2.5G synchronous protocol or 3G asynchronous protocol, and generates one corresponding output signal point.

Hereinafter, a method applied to the dual stack mobile communication system described above will now be explained with reference to the functions and operations of the constitutional elements of the system as shown in FIGS. 4 to 7.

Figure 8:
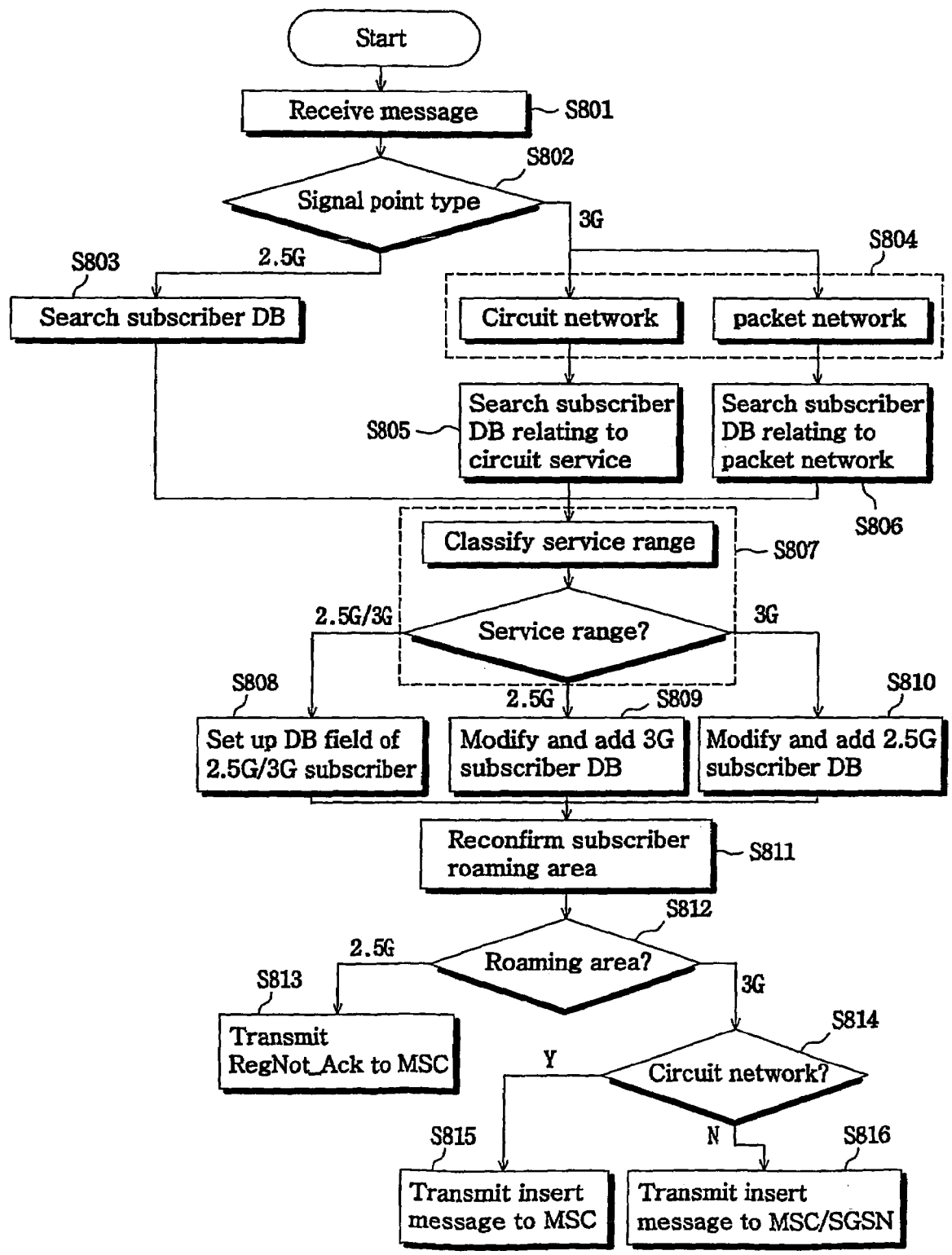
FIG. 8 is a flowchart showing a signal processing method for network interworking location registration of the dual stack HLR of the dual stack mobile communication system in accordance with the present invention.

FIG. 8 is a flowchart showing a signal processing method for network interworking location registration of the dual stack HLR of the dual stack mobile communication system in accordance with the present invention, which is applied to the interworking/transformation processing module 540 of the dual stack HLR 500 of FIGS. 4 and 5.

When the dual stack HLR 500 receives the location registration message for the subscriber from the 2.5G or 3G network through its No.7 protocol processing module 530 (S801), it decides whether the signal point type of the received message is the 2.5G or 3G (S802).

When the signal point type is the 2.5G, the dual stack HLR 500 searches the corresponding subscriber DB from the 2.5G subscriber DB 511 (S803), and when the signal point type is the 3G, it classifies the signal point type into the circuit network or packet network (S804). When the signal point type is the circuit network, the dual stack HLR 500 searches the corresponding subscriber DB relating to the circuit services from the 3G subscriber DB 521 (S805), and when the signal point type is the packet network, it searches the corresponding subscriber DB relating to the packet network (GPRS) from the 3G subscriber DB 521 (S806).

After searching the subscriber DB in steps S803, S805 or S806, the dual stack HLR 500 decides whether the service range for the subscriber is the 2.5G single type service, the 3G single type service or the 2.5G/3G integration type service (S807).

As a result, when the service range is the 2.5G/3G integration service, the dual stack HLR 500 sets up corresponding fields of the subscriber DBs 511 and 521 of the 2.5G and 3G (S808), when the service range is the 2.5G single type service, it modifies and adds the field of the 3G subscriber DB 521 corresponding to the field of the 2.5G subscriber DB 511 (S809), and when the service range is the 3G single type service, it modifies and adds the field of the 2.5G subscriber DB 511 corresponding to the field of the 3G subscriber DB 521 (S810).

After processing the corresponding subscriber DB in S808, S809 or S810, the dual stack HLR 500 re-confirms the roaming area of the subscriber (S811), and decides whether the roaming area is the 2.5G or 3G (S812).

When the roaming area is the 2.5G, the dual stack HLR 500 generates the response message(RegNot_Ack) to the location registration request message according to the 2.5G protocol and transmits it to the corresponding 2.5G MSC (S813), and when the roaming area is the 3G, it decides whether the roaming area is the circuit network or packet network (S814). When the roaming area is the circuit network, the dual stack HLR 500 generates the insert message according to the 3G protocol and transmits it to the corresponding 3G MSC (S815), and when the roaming area is the packet network, the dual stack HLR 500 generates the insert message and transmits it to the corresponding 3G MSC and SGSN (S816).

Figure 9:
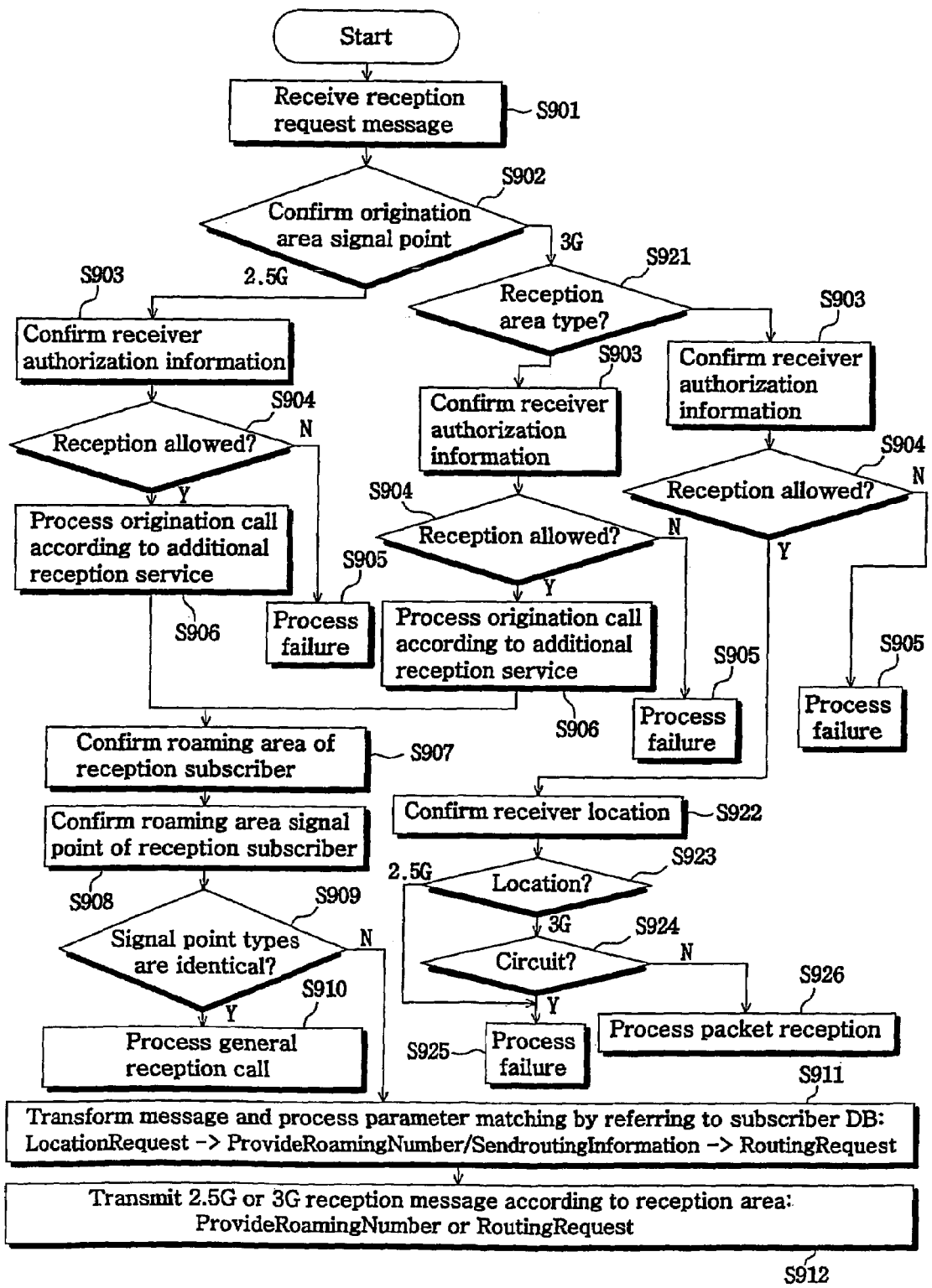
FIG. 9 is a flowchart showing a signal processing method for network interworking basic call reception of the dual stack HLR of the dual stack mobile communication system in accordance with the present invention.

FIG. 9 is a flowchart showing a signal processing method for network interworking basic call reception of the dual stack HLR of the dual stack mobile communication system in accordance with the present invention, which is applied to the interworking/transformation processing module 540 of the dual stack HLR 500 of FIGS. 4 and 5.

When the dual stack HLR 500 receives the reception request message from the 2.5G or 3G network through its No.7 protocol processing module 530 (S901), it decides whether the origination area signal point type of the received message is the 2.5G or 3G (S902).

As the decision result of S902, when the origination area signal point type is the 2.5G, the dual stack HLR 500 confirms the receiver authorization information (S903) and decides reception permission (S904). When the reception is not allowed due to non-reception authorization, it processes reception failure (S905).

As the decision result of S904, when the reception is allowed, the dual stack HLR 500 processes the origination call according to the additional reception service. For example, if the reception subscriber is the originator display service subscriber, the dual stack HLR 500 processes the call with its origination number displayed in the call message, and if not, it processes the call without displaying its origination number (S906).

The dual stack HLR 500 confirms the roaming area of the reception subscriber (S907), and also confirms the roaming area signal point of the reception subscriber (S908). Thereafter, the dual stack HLR 500 decides whether the origination area signal point type confirmed in S902 is identical to the reception area signal point type confirmed in S908 (S909).

As the decision result of S909, when the two signal point types are identical, the dual stack HLR 500 processes the general reception call according to the 2.5G protocol (S910), and when the two signal point types are different, it transforms the 2.5G message into the 3G message because the origination is the 2.5G and the reception is the 3G, and performs parameter matching with reference to the subscriber DB. Here, the dual stack HLR 500 transforms the reception request message (namely, Location$_{13}$ Request) received in S901 from the 2.5G O-MSC according to the 2.5G protocol into the 3G reception routing information request message (namely, Provide_Roaming_Number) according to the 3G protocol, and transmits it to the 3G T-MSC (S911 and S912).

On the other hand, as the decision result of S902, when the origination area signal point type is the 3G, the dual stack HLR 500 decides whether the reception area type is the circuit network or packet network (S921). When the reception area type is the circuit network, it performs the procedure of S903 to S909.

As the decision result of S909, when the origination area signal point type confirmed in S902 is identical to the reception area signal point type confined in S908, the dual stack HLR 500 performs the general circuit network reception call according to the 3G protocol (S910), and when the two signal point types are not identical, it transforms the 3G message into the 2.5G message because the origination is the 3G and the reception is the 2.5G, and performs parameter matching with reference to the subscriber DB (S911). Here, the dual stack HLR 500 transforms the reception request message (namely, Send_Routing_Information) received in S901 from the 3G O-MSC according to the 3G protocol into the 2.5G reception routing information request message (namely, Routing_Request) according to the 2.5G protocol, and transmits it to the 2.5G T-MSC (S912).

Figure 10:
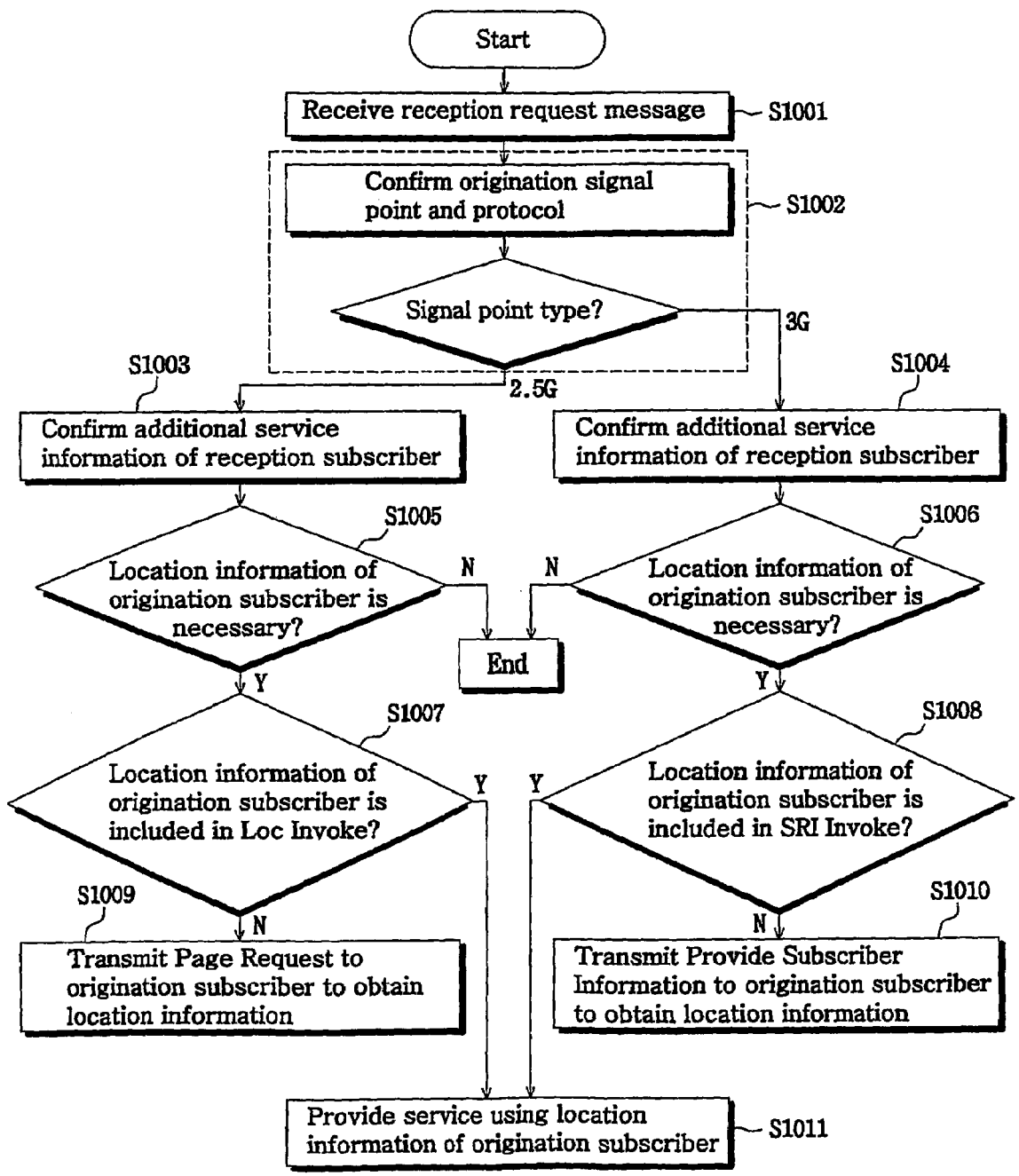
FIG. 10 is a flowchart showing a signal processing method for acquiring originator location information in network interworking of the dual stack HLR of the dual stack mobile communication system in accordance with the present invention.

In addition, as the decision result of S921, when the reception area type is the packet network, the dual stack HLR 500 performs the procedure of S903 to S905. Here, when the reception is allowed in S904, the dual stack HLR 500 confirms the receiver location (S922), and decides whether the receiver location is the 2G or 3G (S923). When the receiver location is the 3G, the dual stack HLR 500 confirms whether the reception area type is the packet network or circuit network (S924). When the receiver location is the 2G in S923 or when the reception area type is the circuit network in S924, the dual stack HLR 500 processes reception failure or else (for example, synchronous voice data) (S925). When the reception area type is the packet network in S924, the dual stack HLR 500 processes the general packet reception according to the 3G protocol (S926);

FIG. 10 is a flowchart showing a signal processing method for acquiring originator location information in network interworking of the dual stack HLR of the dual stack mobile communication system in accordance with the present invention, which is applied to the interworking/transformation processing module 540 of the dual stack HLR 500 of FIGS. 4 and 5.

When the dual stack HLR 500 receives the reception request message from the 2.5G or 3G network through its No.7 protocol processing module 530 (S1001), it confirms the origination signal point of the message and the protocol, and decides whether the origination area signal point type is the 2.5G or 3G (S1002).

As the decision result of S1002, when the origination area signal point type is the 2.5G, the dual stack HLR 500 confirms the additional service information of the reception subscriber (S1003) and decides whether the location information of the origination subscriber is necessary (S1005). If necessary, the dual stack HLR 500 decides whether the location information of the origination subscriber is included in the 2.5G reception request message (namely, Location Request) invoke (S1007). If not, the dual stack HLR 500 transmits the page request message to the corresponding origination subscriber to obtain the location information (S1009).

As the decision result of S1002, when the origination area signal point type is the 3G, the dual stack HLR 500 confirms the additional service information of the reception subscriber (S1004) and decides whether the location information of the origination subscriber is necessary (S1006). If necessary, the dual stack HLR 500 decides whether the location information of the origination subscriber is included in the 3G reception request message (namely, SRI) invoke (S1008). If not, the dual stack HLR 500 transmits the subscriber information to the corresponding origination subscriber to obtain the location information (S1010).

On the other hand, when the location information of the origination subscriber is included in S1007 or S1008, the dual stack HLR 500 provides the service using the location information of the origination subscriber (S1011).

Figure 11:
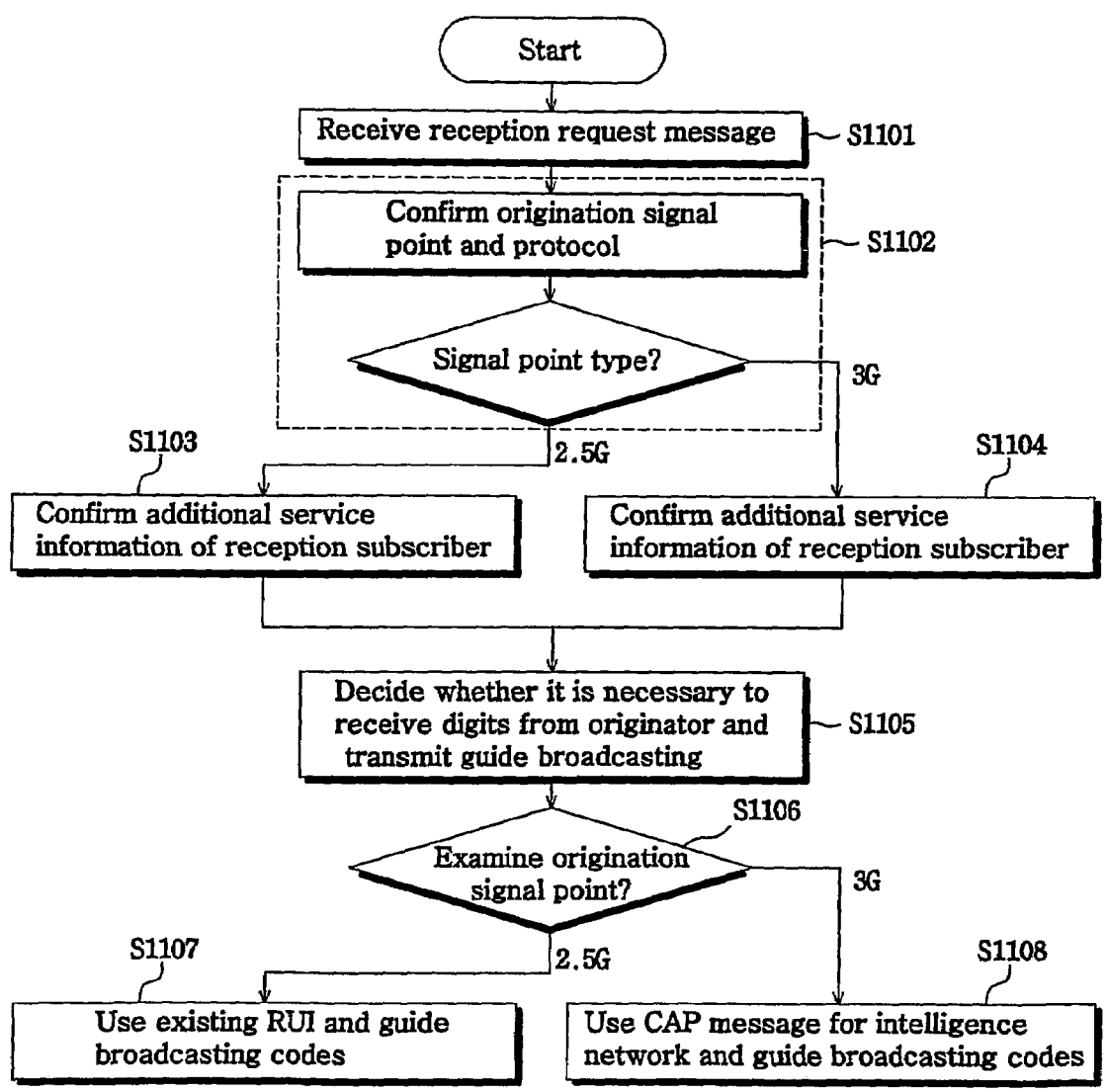
FIG. 11 is a flowchart showing a signal processing method for receiving subscriber digits and providing guide broadcasting in network interworking of the dual stack HLR of the dual stack mobile communication system in accordance with the present invention.

FIG. 11 is a flowchart showing a signal processing method for receiving subscriber digits and providing guide broadcasting in network interworking of the dual stack HLR of the dual stack mobile communication system in accordance with the present invention, which is applied to the interworking/transformation processing module 540 of the dual stack HLR 500 of FIGS. 4 and 5.

When the dual stack HLR 500 receives the reception request message from the 2.5G or 3G network through its No.7 protocol processing module 530 (S 1101), it confirms the origination signal point of the message and the protocol, and decides whether the origination area signal point type is the 2.5G or 3G (S1102).

The dual stack HLR 500 confirms the additional service information of the reception subscriber regardless of the origination area signal point type (S1103 and S1104), and also confirms whether it is necessary to receive the digits from the originator and transmit the guide broadcasting (S1105). If necessary, the dual stack HLR 500 examines the origination signal point of S1102 (S1106).

As the examination result of S1106, when the origination signal point is the 2.5G, the dual stack HLR 500 receives the digits from the originator and transmits the guide broadcasting by using remote user interaction directive (RUI, MAP message) based on the 2.5G protocol and guide broadcasting codes (S1107), and when the origination signal point is the 3G, it receives the digits from the originator and transmits the guide broadcasting by using prompt and user interaction (CAP message) which is an intelligence network message based on the 3G protocol and the guide broadcasting codes (S1108).

Figure 12:
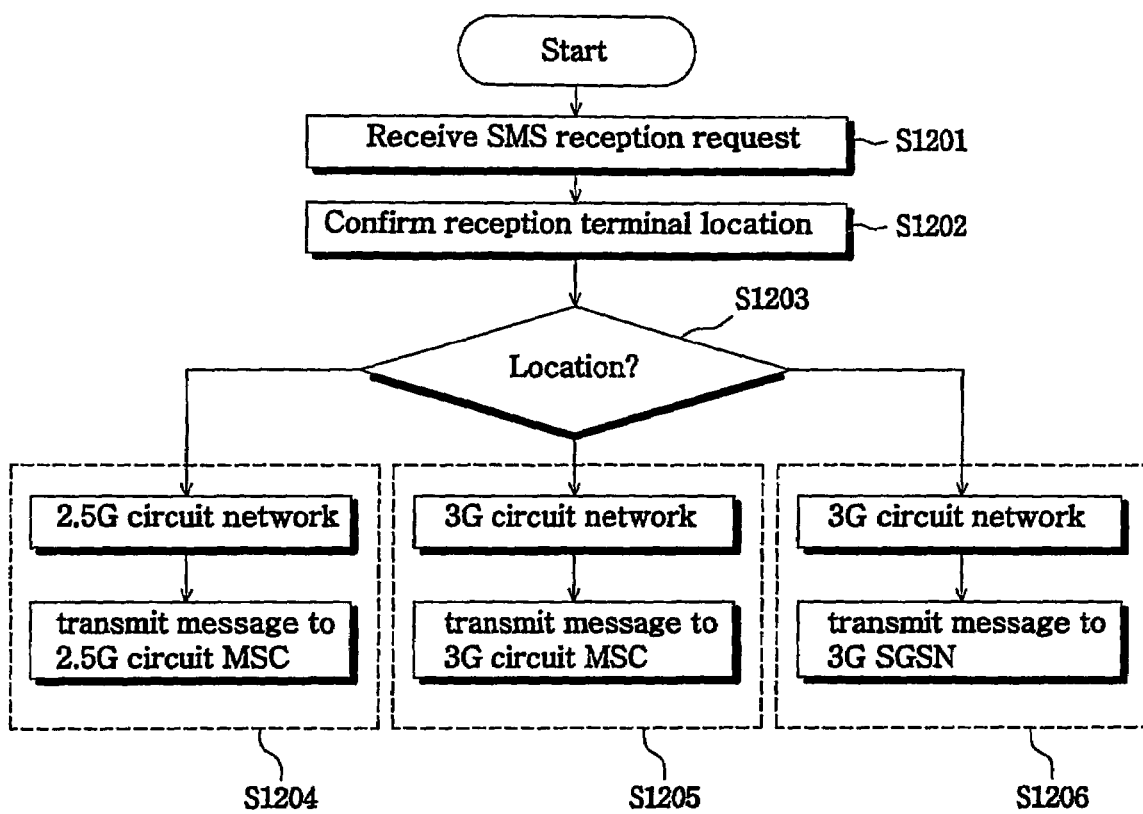
FIG. 12 is a flowchart showing a data network interworking method of a dual stack short message service center of the dual stack mobile communication system in accordance with the present invention.

FIG. 12 is a flowchart showing a data network interworking method of a dual stack SMC of the dual stack mobile communication system in accordance with the present invention, which is applied to the short message interworking/transformation processing module 640 of the dual stack SMC 600 of FIGS. 4 and 6.

When the dual stack SMC 600 receives the SMS reception request message from the reception terminal through its No.7 protocol processing module 630 (S1201), it searches and confirms the location of the reception terminal (S1202 and S1203).

As the confirmation result of S1203, when the location of the reception terminal is the 2G circuit network, the dual stack SMC 600 transmits a short message to a corresponding 2G circuit MSC (S1204), when the location of the reception terminal is the 3G circuit network, it transmits a short message to a corresponding 3G circuit MSC (S1205), and when the location of the reception terminal is the 3G packet network, it transmits a short message to a corresponding 3G SGSN (S1206).

Figure 13:
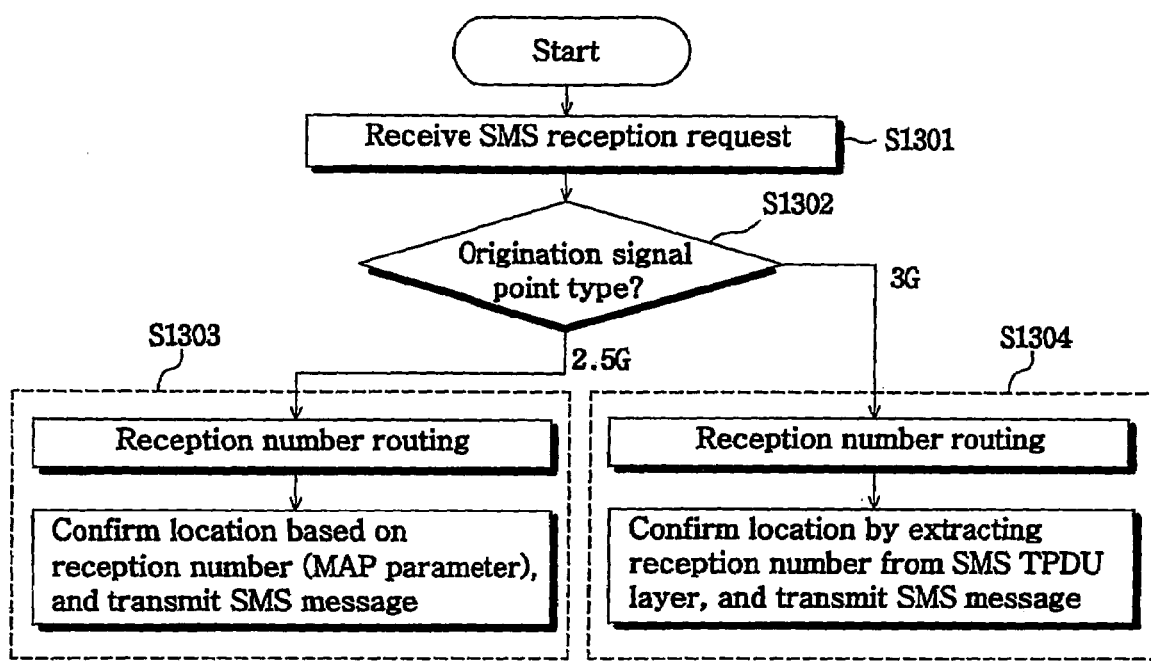
FIG. 13 is a flowchart showing a short message service routing method in network interworking of the dual stack short message service center of the dual stack mobile communication system in accordance with the present invention.

FIG. 13 is a flowchart showing an SMS routing method in network interworking of the dual stack SMC of the dual stack mobile communication system in accordance with the present invention, which is applied to the short message interworking/transformation processing module 640 of the dual stack SMC 600 of FIGS. 4 and 6.

When the dual stack SMC 600 receives the SMS reception request message from the reception terminal through its No.7 protocol processing module 630 (S1301), it decides whether the origination signal point type of the short message is the 2.5G or 3G (S1302).

As the decision result of S1302, when the origination signal point type is the 2.5G, the dual stack SMC 600 confirms the reception location on the basis of the reception number (MAP parameter) and transmits the SMS message to the confirmed location to perform the reception-based routing (S1303), and when the origination signal point type is the 3G, the dual stack SMC 600 confirms the reception location by extracting the reception number of the TTDU layer which is an SMS user data and transmits the SMS message to the confirmed location to perform the origination-based routing (S1304).

Figure 14:
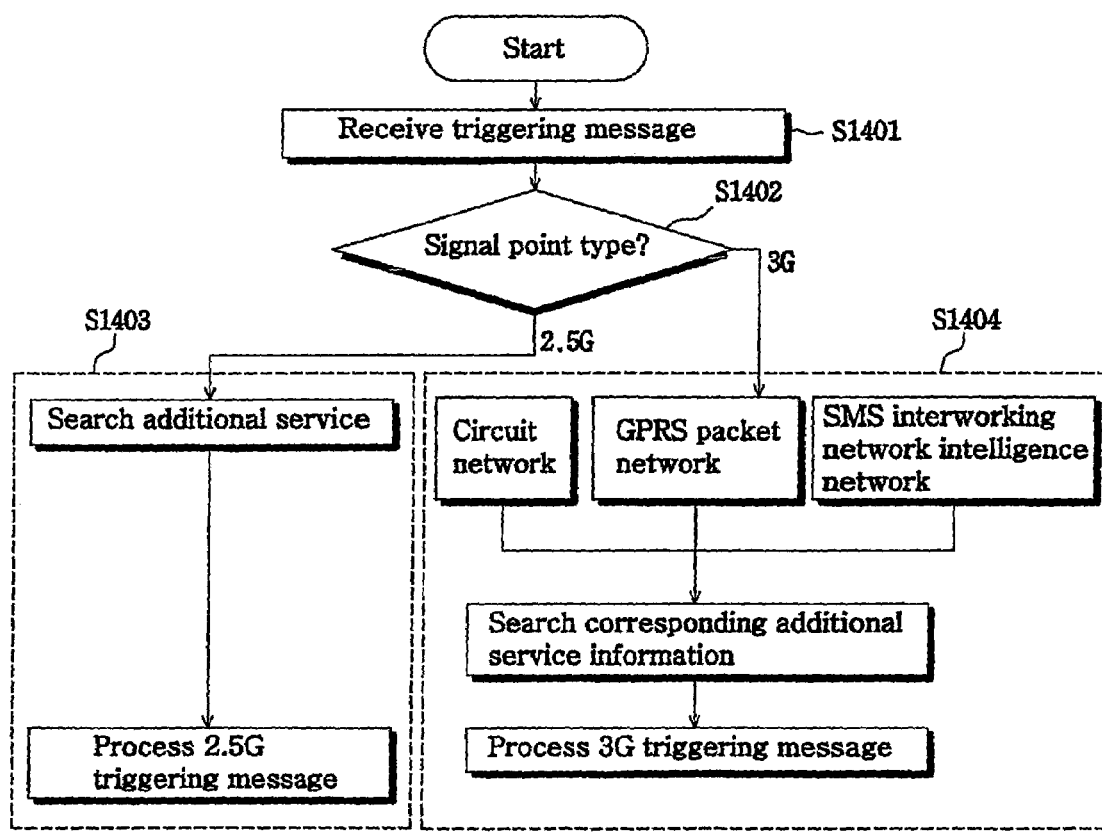
FIG. 14 is a flowchart showing a triggering message processing method by signal points in network interworking of the dual stack service control point of the dual stack mobile communication system in accordance with the present invention.

FIG. 14 is a flowchart showing a triggering message processing method by signal points in network interworking of the dual stack service control point of the dual stack mobile communication system in accordance with the present invention, which is applied to the short message interworking/transformation processing module 740 of the dual stack SMC 700 of FIGS. 4 and 7.

When the dual stack SMC 700 receives the triggering message through its No.7 protocol processing module 730 (S1401), it decides whether the signal point type of the triggering message is the 2.5G or 3G (S1402). As the decision result of S1402, when the signal point type is the 2.5G, the dual stack SMC 700 searches the additional service of the subscriber and processes the 2.5G triggering message according to the 2.5G protocol (S1403), and when the signal point type is the 3G, the dual stack SMC 700 classifies the signal point type into the circuit network, the GPRS packet network or the SMS interworking network, searches the additional service information of the subscriber in the corresponding network, and processes the 3G triggering message (S1404).

The operation of the dual stack mobile communication system as shown in FIGS. 4 to 14 will now be explained specifically in call forwarding.

Figure 15:
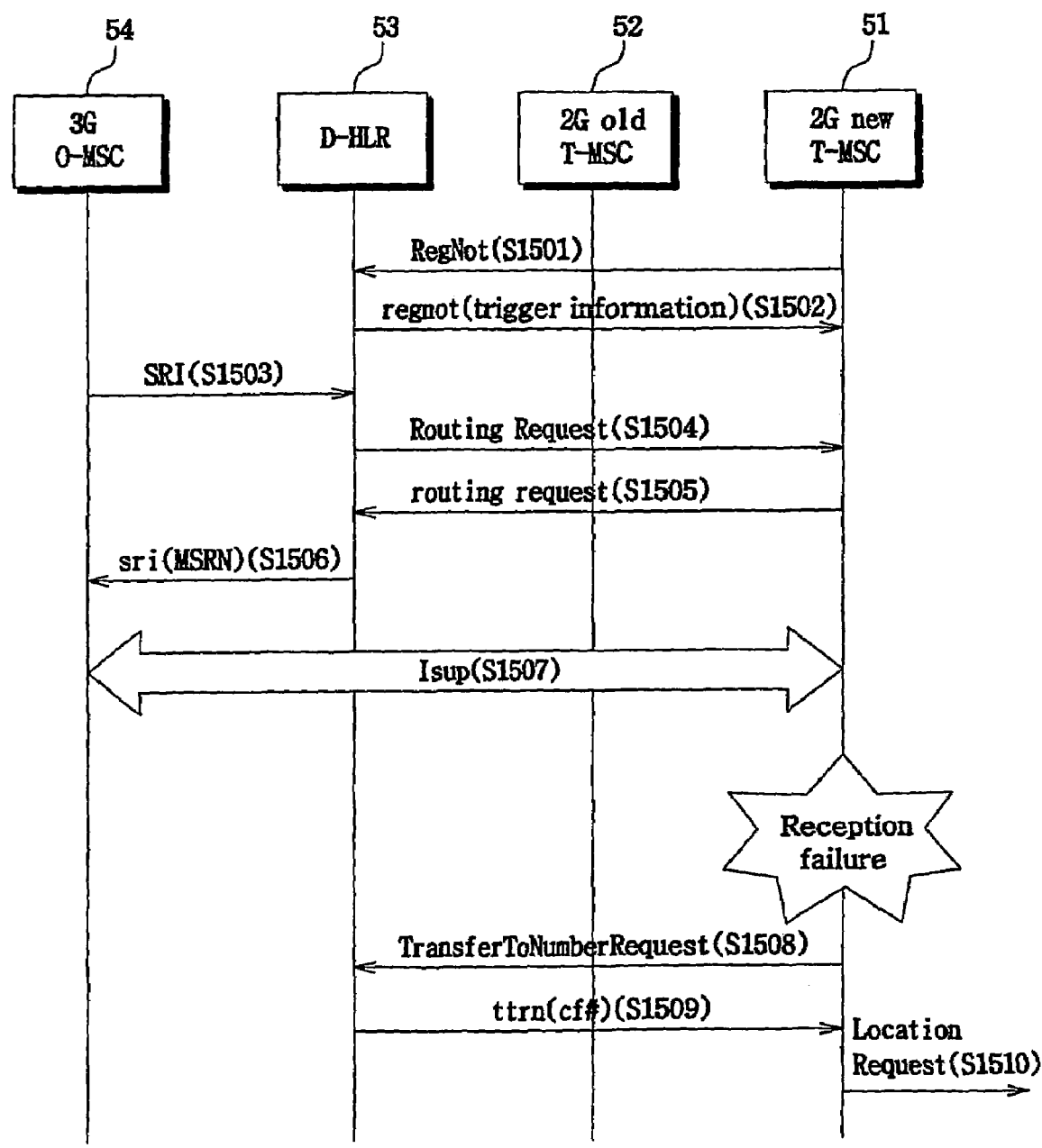
FIG. 15 is a flowchart showing the operation of the dual stack mobile communication system specifically in call forwarding in accordance with the present invention.

FIG. 15 is a flowchart showing the operation of the dual stack mobile communication system in the call forwarding in accordance with the present invention. Reference numerals 51 and 52 denote the 2.5G MSC 413 of FIG. 4, reference numeral 54 denotes the 3G MSC 423 of FIG. 4, and reference numeral 53 denotes the dual stack HLR 500 of FIG. 4.

When a 3G subscriber reception mobile terminal (not shown) which has accessed the 2G old T-MSC 52 moves and newly accesses the 2G new T-MSC 51, the 2G new T-MSC 51 requests location registration to the dual stack HLR (D-HLR) 53 according to the location registration procedure of the old network(Registration Notification; RegNot.)(S1501), and the D-HLR 53 transmits the response message including the trigger information to the 2G new T-MSC 51 (S1502).

Here, when a 3G subscriber origination mobile terminal (not shown) accesses the 3G O-MSC 54 and originates a call to the reception mobile terminal, the 3G O-MSC 54 requests message type reception information under the 3G asynchronous protocol to the D-HLR 53(Send for Routing Information; SRI) (S1503), and the D-HLR 53 requests routing under the 2G synchronous protocol to the 2G new T-MSC 51 which the reception mobile terminal has accessed because the 2G new T-MSC 51 is the old network MSC(Routing Request) (S1504).

The 2G new T-MSC 51 provides the TLDN information of the reception terminal to the D-HLR 53 according to the 2G synchronous protocol as the routing information in response to the routing request (S1505), and thus the D-HLR 53 provides the new network MSRN corresponding to the old network TLDN to the 3G O-MSC 54 in response to the reception information request of S1503(sri_Ack) (S1506), thereby forming a call path between the 3G O-MSC 54 and the 2G new T-MSC 51(Isup) (S1507).

After the call path is formed, the 2G new T-MSC 51 performs signaling for reception to the reception mobile terminal. When the reception is not successful, the 2G new T-MSC 51 performs the general call forwarding procedure as in the old network on the basis of the trigger information received in S1502. In accordance with the present invention, the redirection request message transmission function of the 2G new T-MSC 51 is set up to be off. Accordingly, when the reception failure occurs and the trigger information exists in the 2G new T-MSC 51, the 2G new T-MSC 51 requests the call switching information for call forwarding to the D-HLR 53 according to the old network protocol procedure(Transfer To Number Request) (S1508), and the D-HLR 53 provides the call switching information, namely call forwarding information (cf#) to the 2G new T-MSC 51 (S1509).

When the reception failure occurs in the 2G new T-MSC 51, the 2G new T-MSC 51 can perform the redirection request or TTNR according to the trigger information. In this case, the origination and reception MSCs are different types, namely the asynchronous (3G) type and the synchronous (2G) type, an thus the 2G new T-MSC 51 turns off the redirection request message in regard to the 3G O-MSC 54. As a result, the message transmitted according to the setup trigger becomes the TTNR as in S1508.

Thereafter, the 2G new T-MSC 51 forms a call path for call forwarding with a new T-MSC (not shown) through the medium of an HLR (not shown) on the basis of the call forwarding information (cf#), and finishes the reception (S1510).

The D-HLR 53 includes the dual stack composed of the protocol stack of the 2G synchronous network and the protocol stack of the 3G asynchronous stack. As shown in S1503 and S1504, even when receiving the 3G synchronous message from the 3G O-MSC 54, the D-HLR 53 generates and transmits the 2G synchronous message(Routing Request) corresponding to the SRI because the reception signal point is the 2G new T-MSC 51 (refer to S911 of FIG. 9).

As described above, the dual stack nodes, namely the dual stack HLR 500, the dual stack SMC 600 and the dual stack SCP 700 of FIG. 4 search information for generating two output signal points according to the synchronous protocol and the asynchronous protocol in one input signal point according to the synchronous protocol or asynchronous protocol, and generate and transmit one corresponding output signal point.

As discussed earlier, in accordance with the present invention, the dual stack mobile communication system can smoothly interwork the old network and the new network in all the services which have been individually provided in the old network and the new network by overcoming mismatching of the messages and subscriber profiles due to different protocols of the two networks, without introducing a gateway and a complicated message flow.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A dual stack mobile communication system of a mobile communication network, comprising:
    a synchronous network mobile; and
    an asynchronous network mobile,
    wherein a single node is formed by combining same kind nodes of the synchronous mobile network and the asynchronous mobile network,
    wherein the single node searches information for generating two output signal points according to a synchronous protocol associated with the synchronous mobile network and an asynchronous protocol associated with the asynchronous mobile network using one input signal point according to the synchronous protocol or asynchronous protocol, and generates one output signal point; and
    wherein the same kind nodes comprise a home location register, a short message service center and a service control point which is an intelligence network managing device.

2. A dual stack mobile communication system of a mobile communication network in which a synchronous network and an asynchronous network coexist, comprising:
    a synchronous mobile communication system which comprises a base station for performing radio section communication with a synchronous mobile terminal, and a first mobile switching center for switching calls from the base station or thereto;
    an asynchronous mobile communication system which comprises a node B for performing radio section communication with an synchronous mobile terminal, a radio network controller for controlling the node B, and a second mobile switching center connected to the radio network controller for switching calls;
    an SS7 network for mutually connecting the first mobile switching center and the second mobile switching center;
    a dual stack home location register, connected to the SS7 network, for managing subscriber locations, receiving an input message, deciding a protocol to process the input message and an output signal point according to the signal point type of the input message, and sending an output message to the output signal point;
    a dual stack short message service center, connected to the SS7 network, for managing short message services (SMS), receiving an SMS request message, deciding a protocol to process the SMS request message and an output signal point according to the signal point type of the SMS request message, and sending an output message to the output signal point; and
    a dual stack service control point, connected to the SS7 network, for managing intelligence network services, receiving a triggering message, and deciding a protocol to process the triggering message according to the signal point type of the triggering message.

3. A dual stack mobile communication system of a mobile communication network in which a synchronous network and an asynchronous network coexist, comprising:
    a synchronous mobile communication system which comprises a base station for performing radio section communication with a synchronous mobile terminal, and a first mobile switching center for switching calls from the base station or thereto;
    an asynchronous mobile communication system which comprises a node B for performing radio section communication with an synchronous mobile terminal, a radio network controller for controlling the node B, and a second mobile switching center connected to the radio network controller for switching calls;
    an SS7 network for mutually connecting the first mobile switching center and the second mobile switching center; and
    a dual stack home location register, connected to the SS7 network, for managing subscriber locations, receiving an input message, deciding a protocol to process the input message and an output signal point according to the signal point type of the input message, and sending an output message to the output signal point.

4. A dual stack mobile communication system of a mobile communication network in which a synchronous network and an asynchronous network coexist, comprising:
    a synchronous mobile communication system which comprises a base station for performing radio section communication with a synchronous mobile terminal, and a first mobile switching center for switching calls from the base station or thereto;
    an asynchronous mobile communication system which comprises a node B for performing radio section communication with an synchronous mobile terminal, a radio network controller for controlling the node B, and a second mobile switching center connected to the radio network controller for switching calls;
    an SS7 network for mutually connecting the first mobile switching center and the second mobile switching center; and
    a dual stack short message service center, connected to the SS7 network, for managing short message services (SMS), receiving an SMS request message, deciding a protocol to process the SMS request message and an output signal point according to the signal point type of the SMS request message, and sending an output message to the output signal point.

5. A dual stack mobile communication system of a mobile communication network in which a synchronous network and an asynchronous network coexist, comprising:
    a synchronous mobile communication system which comprises a base station for performing radio section communication with a synchronous mobile terminal, and a first mobile switching center for switching calls from the base station or thereto;
    an asynchronous mobile communication system which comprises a node B for performing radio section communication with an synchronous mobile terminal, a radio network controller for controlling the node B, and a second mobile switching center connected to the radio network controller for switching calls;
    an SS7 network for mutually connecting the first mobile switching center and the second mobile switching center; and
    a dual stack service control point, connected to the SS7 network, for managing intelligence network services, receiving a triggering message, and deciding a protocol to process the triggering message according to the signal point type of the triggering message.

* * * * *